US009432160B2

(12) United States Patent
Darwood et al.

(10) Patent No.: US 9,432,160 B2
(45) Date of Patent: *Aug. 30, 2016

(54) ALLOCATING RESOURCES AND TRANSMITTING DATA IN MOBILE TELECOMMUNICATION SYSTEMS COMPRISING MACHINE TYPE COMMUNICATION APPLICATIONS

(75) Inventors: Peter Darwood, Chippenham (GB); Martin Beale, Bristol (GB); Darren McNamara, Bristol (GB); Atsushi Yoshizawa, Tokyo (JP); Yuichi Morioka, Reading (GB)

(73) Assignee: SCA IPLA HOLDINGS INC., New York, NY (US)

( * ) Notice: Subject to any disclaimer, the term of this patent is extended or adjusted under 35 U.S.C. 154(b) by 257 days.

This patent is subject to a terminal disclaimer.

(21) Appl. No.: 14/238,235

(22) PCT Filed: Aug. 6, 2012

(86) PCT No.: PCT/GB2012/051901
§ 371 (c)(1),
(2), (4) Date: Mar. 19, 2014

(87) PCT Pub. No.: WO2013/021187
PCT Pub. Date: Feb. 14, 2013

(65) Prior Publication Data
US 2014/0194133 A1    Jul. 10, 2014

(30) Foreign Application Priority Data

Aug. 11, 2011   (GB) .................................. 1113801.3

(51) Int. Cl.
*H04L 5/00*    (2006.01)
*H04W 16/32*   (2009.01)

(52) U.S. Cl.
CPC ........... *H04L 5/0037* (2013.01); *H04L 5/0041* (2013.01); *H04L 5/0044* (2013.01);

(Continued)

(58) Field of Classification Search
None
See application file for complete search history.

(56) References Cited

U.S. PATENT DOCUMENTS

| 2005/0245258 A1 | 11/2005 | Classon et al. |
| 2008/0112359 A1 | 5/2008 | Cleveland et al. |

(Continued)

FOREIGN PATENT DOCUMENTS

| GB | 2487757 A | 8/2012 |
| GB | 2487780 A | 8/2012 |

(Continued)

OTHER PUBLICATIONS

U.S. Appl. No. 14/238,290, filed Feb. 11, 2014, Darwood, et al.

(Continued)

*Primary Examiner* — Charles Appiah
*Assistant Examiner* — Margaret G Mastrodonato
(74) *Attorney, Agent, or Firm* — Oblon, McClelland, Maier & Neustadt, L.L.P

(57) ABSTRACT

A method of communicating data in a wireless telecommunications system between plural base stations and plural terminal devices using plural Orthogonal Frequency Division Multiplex, OFDM, sub-carriers spanning a first frequency bandwidth. The method includes: communicating data between a first base station and a first terminal device using a first group of the OFDM sub-carriers distributed across the first frequency bandwidth, communicating data between a second base station, geographically separated from the first base station, and a second terminal device using a second group of the OFDM sub-carriers distributed across a second frequency bandwidth, and communicating control-plane data between the first base station and the first terminal device using a combination of the first and second groups of the OFDM sub-carriers. Guard regions may be provided in the frequency domain between frequencies of transmissions associated with the first base station and frequencies of transmissions associated with the second base station.

36 Claims, 18 Drawing Sheets

(52) U.S. Cl.
CPC ........... *H04L5/0048* (2013.01); *H04L 5/0053* (2013.01); *H04L 5/0066* (2013.01); *H04W 16/32* (2013.01); *H04L 5/0007* (2013.01)

(56) References Cited

U.S. PATENT DOCUMENTS

| | | | |
|---|---|---|---|
| 2009/0303918 A1* | 12/2009 | Ma | H04B 7/2606 370/315 |
| 2011/0085457 A1 | 4/2011 | Chen et al. | |
| 2011/0205995 A1 | 8/2011 | Grovlen | |
| 2012/0327894 A1* | 12/2012 | Axmon | H04W 48/12 370/330 |
| 2013/0288698 A1* | 10/2013 | Rune | H04W 52/0216 455/452.1 |
| 2014/0010184 A1 | 1/2014 | McNamara et al. | |
| 2014/0036821 A1 | 2/2014 | McNamara et al. | |

FOREIGN PATENT DOCUMENTS

| | | |
|---|---|---|
| GB | 2487782 A | 8/2012 |
| GB | 2487906 A | 8/2012 |
| GB | 2487907 A | 8/2012 |
| GB | 2487908 A | 8/2012 |
| GB | 2487909 A | 8/2012 |
| GB | 2488513 A | 9/2012 |
| JP | 2014-529934 | 11/2014 |
| WO | WO 01/82544 A2 | 11/2001 |
| WO | WO 2007/051193 A2 | 5/2007 |
| WO | WO 2008/004155 A2 | 1/2008 |
| WO | WO 2010/049754 A1 | 5/2010 |
| WO | WO 2010/118382 A1 | 10/2010 |

OTHER PUBLICATIONS

Search Report issued Dec. 7, 2011 in United Kingdom Patent Application No. GB1113801.3.
International Search Report issued Nov. 6, 2012 in PCT/GB2012/051901.
Ian F. Akyildiz, et al., "The evolution to 4G cellular systems: LTE-Advanced" Physical Communication, vol. 3, No. 4, XP027536175, Dec. 1, 2010, pp. 217-244.
"Digital cellular telecommunications system (Phase 2+)" 3GPP TS 22.368, ETSI TS 122 368, vol. 10.5.0, No. 10, Jul. 2011, 18 pages.
Office Action issued Mar. 29, 2016 in Japanese Patent Application 2014-525486.

* cited by examiner

ALLOCATING RESOURCES AND TRANSMITTING DATA IN MOBILE TELECOMMUNICATION SYSTEMS COMPRISING MACHINE TYPE COMMUNICATION APPLICATIONS

CROSS-REFERENCE TO RELATED APPLICATIONS

The present application is based on PCT Filing PCT/GB2012/051901 filed 06 Aug. 2012, and claims priority to British Patent Application 1113801.3, filed in the UK IPO on Aug. 11, 2011, the entire contents of each of which being incorporated herein by reference.

BACKGROUND OF THE INVENTION

The present invention relates to methods, systems and apparatus for allocating transmission resources and transmitting data in mobile telecommunication systems.

Third and fourth generation mobile telecommunication systems, such as those based on the 3GPP defined UMTS and Long Term Evolution (LTE) architecture are able to support more sophisticated services than simple voice and messaging services offered by previous generations of mobile telecommunication systems.

For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly.

The anticipated widespread deployment of third and fourth generation networks has led to the parallel development of a class of devices and applications which, rather than taking advantage of the high data rates available, instead take advantage of the robust radio interface and increasing ubiquity of the coverage area. Examples include so-called machine type communication (MTC) applications, which are typified by semi-autonomous or autonomous wireless communication devices (i.e. MTC devices) communicating small amounts of data on a relatively infrequent basis. Examples include so-called smart meters which, for example, are located in a customer's house and periodically transmit information back to a central MTC server data relating to the customers consumption of a utility such as gas, water, electricity and so on. Further information on characteristics of MTC-type devices can be found, for example, in the corresponding standards, such as ETSI TS 122 368 V10.530 (2011-07)/3GPP TS 22.368 version 10.5.0 Release 10) [1].

Whilst it can be convenient for a terminal such as an MTC type terminal to take advantage of the wide coverage area provided by a third or fourth generation mobile telecommunication network there are at present disadvantages. Unlike a conventional third or fourth generation terminal device such as a smartphone, an MTC-type terminal is preferably relatively simple and inexpensive. The type of functions performed by the MTC-type terminal (e.g. collecting and reporting back data) do not require particularly complex processing to perform. However, third and fourth generation mobile telecommunication networks typically employ advanced data modulation techniques on the radio interface which can require more complex and expensive radio transceivers to implement. It is usually justified to include such complex transceivers in a smartphone as a smartphone will typically require a powerful processor to perform typical smartphone type functions. However, as indicated above, there is now a desire to use relatively inexpensive and less complex devices to communicate using LTE type networks. In parallel with this drive to provide network accessibility to devices having different operational functionality, e.g. reduced bandwidth operation, is a desire to optimise the use of the available bandwidth in a telecommunications system supporting such devices.

SUMMARY OF THE INVENTION

According to a first aspect of the invention there is provided a method of communicating data in a wireless telecommunications system between a plurality of base stations and a plurality of terminal devices using a plurality of Orthogonal Frequency Division Multiplex, OFDM, sub-carriers spanning a first frequency bandwidth. The method comprises communicating user-plane data between a first base station and a first terminal device using a first group of the OFDM sub-carriers distributed across the first frequency bandwidth, communicating user-plane data between a second base station and a second terminal device using a second group of the OFDM sub-carriers distributed across a second frequency bandwidth, wherein the second frequency bandwidth is smaller than and within the first frequency bandwidth; and communicating control-plane data between the first base station and the first terminal device using a combination of the first and second groups of the OFDM sub-carriers.

The second base station may thus use the second group of the OFDM sub-carriers to support communications with associated terminal devices using what is in effect a virtual carrier defined within the operating bandwidth of the first base-station but operating from a different base station. The virtual carrier may be primarily arranged to serve terminal devices of a particular kind, for example machine-type terminal devices associated with machine-type communications, having reduced operating capability compared to terminal devices served by the first base station. For example, terminal devices served by the second base station may have limited operating bandwidth capability commensurate with the second frequency bandwidth.

The second base station may be what might be termed a micro-, pico-, femto- or home base station (e-NodeB). Furthermore, in some examples the method may further comprise communicating relay data between the first base station and the second base station using the first group of the OFDM sub-carriers or using a wired link, for example via an internet connection.

In some examples a reduced amount of user-plane data may be communicated using OFDM sub-carriers arranged in frequency at a boundary between OFDM sub-carriers in the first group and OFDM sub-carriers in the second group as compared to the amount of user-plane data communicated using OFDM sub-carriers away from the boundary. For example, user-plane data might be communicated at a lower rate using the OFDM sub-carriers at the boundary, or no user-plane data might be communicated using the OFDM sub-carriers at the boundary. Providing guard regions such as this can help reduce interference from unintended overlaps in transmissions from the two base stations if there is a frequency mismatch between them, for example.

The method may further comprise transmitting reference signals from the first base station using both the first and second groups of the OFDM sub-carriers. This can assist conventional mobile terminals camped-on to the first (host) base station operate in their normal manner regardless of the split in transmission resources from within a single time-frequency grid between different base stations.

A density of reference signals in time and/or frequency from the first base station using the first group of the OFDM sub-carriers may be greater than a density of reference symbols transmitted from the first base station using the second group of the OFDM sub-carriers. This can provide a compromise between disruption to the operation of mobile terminals camped-on to the first base station which expect to see reference symbols across the full operating bandwidth of the first base station, and disruption to the available resources for allocation by the second base station using the second group of sub-carriers.

A reduced amount of user-plane data may be communicated using at least one OFDM sub-carrier which is adjacent in frequency to an OFDM sub-carrier on which a reference signal is transmitted in the second group of the OFDM sub-carriers as compared to an amount of user-plane data communicated using an OFDM sub-carrier in the second group that is not adjacent in frequency to the reference signal. For example, a lower rate of data, or no data, may be transmitted here. This use of guard regions can again help reduce interference from unintended overlaps in transmissions from the two base stations should there be a frequency mismatch between them.

In another example, reference signals from the first base station might be transmitted using only the first group of the OFDM sub-carriers while the second base station is transmitting user-plane date.

In some example implementations there may be no user-plane data communicated between the second base station and the second terminal device while control-plane data is being communicated between the first base station and the first terminal device.

The method may further comprise communicating user-plane data between a further base station and a further terminal device using the second group of the OFDM sub-carriers. Thus the second and further base stations may be configured to communicate data using the same resources, thereby providing for efficient re-use of the available resources. As with the second base station, the further base station may, in some examples, act as a relay base stations for the first base station and communicating relay data with first base station using the first group of the OFDM sub-carriers or using a wired link, for example via an internet connection.

A geographic extent of a communication cell associated with the second base station may be smaller than and within a geographic extent of a communication cell associated with the first base station.

According to another aspect of the invention there is provided a wireless telecommunications system for communicating data between a plurality of base stations and a plurality of terminal devices using a plurality of Orthogonal Frequency Division Multiplex, OFDM, sub-carriers spanning a first frequency bandwidth, the system comprising: a first base station configured to communicate user-plane data with a first terminal device using a first group of the OFDM sub-carriers distributed across the first frequency bandwidth; and a second base station configured to communicate user-plane data with a second terminal device using a second group of the OFDM sub-carriers distributed across a second frequency bandwidth, wherein the second frequency bandwidth is smaller than and within the first frequency bandwidth, wherein the first base station is configured to communicate control-plane data with the first terminal device using a combination of the first and second groups of the OFDM sub-carriers.

According to another aspect of the invention there is provided a method of operating a base station for communicating data between the base station and a plurality of terminal devices in a wireless telecommunications system using a plurality of Orthogonal Frequency Division Multiplex, OFDM, sub-carriers spanning a first frequency bandwidth, the method comprising: communicating user-plane data with the plurality of terminal devices using a group of the OFDM sub-carriers distributed across a second frequency bandwidth which is smaller than and within the first frequency bandwidth; and communicating no user-plane data with the plurality of terminal devices using OFDM sub-carriers outside the group of the OFDM sub-carriers distributed across the second frequency bandwidth.

According to another aspect of the invention there is provided a base station for communicating data with a plurality of terminal devices in a wireless telecommunications system using a plurality of Orthogonal Frequency Division Multiplex, OFDM, sub-carriers spanning a first frequency bandwidth, wherein the base station is configured to: communicate user-plane data with the plurality of terminal devices using a group of the OFDM sub-carriers distributed across a second frequency bandwidth, wherein the second frequency bandwidth is smaller than and within the first frequency bandwidth; and communicate no user-plane data with the plurality of terminal devices using OFDM sub-carriers outside the group of the OFDM sub-carriers distributed across the second frequency bandwidth.

According to another aspect of the invention there is provided a method of operating a terminal device for communicating data in a wireless telecommunications system comprising a first base station and a second base station, wherein the first base station supports communications using a plurality of Orthogonal Frequency Division Multiplex, OFDM, sub-carriers spanning a first frequency bandwidth, the method comprising: communicating user-plane data between the second base station and the terminal device using a group of the OFDM sub-carriers distributed across a second frequency bandwidth, wherein the second frequency bandwidth is smaller than and within the first frequency bandwidth; and communicating no user-plane data between the terminal device and the second base station using OFDM sub-carriers outside the group of the OFDM sub-carriers distributed across the second frequency bandwidth.

According to another aspect of the invention there is provided a terminal device for communicating data in a wireless telecommunications system comprising a first base station and a second base station, wherein the first base station supports communications using a plurality of Orthogonal Frequency Division Multiplex, OFDM, sub-carriers spanning a first frequency bandwidth, wherein the terminal device is configured to: communicate user-plane data between the second base station and the terminal device using a group of the OFDM sub-carriers distributed across a second frequency bandwidth, wherein the second frequency bandwidth is smaller than and within the first frequency bandwidth; and communicate no user-plane data between the terminal device and the second base station using OFDM sub-carriers outside the group of the OFDM sub-carriers distributed across the second frequency bandwidth.

It will be appreciated that features and aspects of the invention described above in relation to the first and other aspects of the invention are equally applicable and may be combined with embodiments of the invention according to the different aspects of the invention as appropriate, and not just in the specific combinations described above.

BRIEF DESCRIPTION OF DRAWINGS

Embodiments of the present invention will now be described by way of example only with reference to the accompanying drawings where like parts are provided with corresponding reference numerals and in which.

DESCRIPTION OF EXAMPLE EMBODIMENTS

Embodiments of the invention may in particular be employed within the context of what might be termed "virtual carriers" operating within a bandwidth of a "host carriers". The concepts of virtual carriers are described in co-pending UK patent applications numbered GB 1101970.0 [2], GB 1101981.7 [3], GB 1101966.8 [4], GB 1101983.3 [5], GB 1101853.8 [6], GB 1101982.5 [7], GB 1101980.9 [8] and GB 1101972.6 [9], the contents of which are incorporated herein by reference. The reader is referred to these co-pending applications for more details, but for ease of reference an overview of the concept of virtual carriers is also provided here.

Conventional Network

Figure 1:
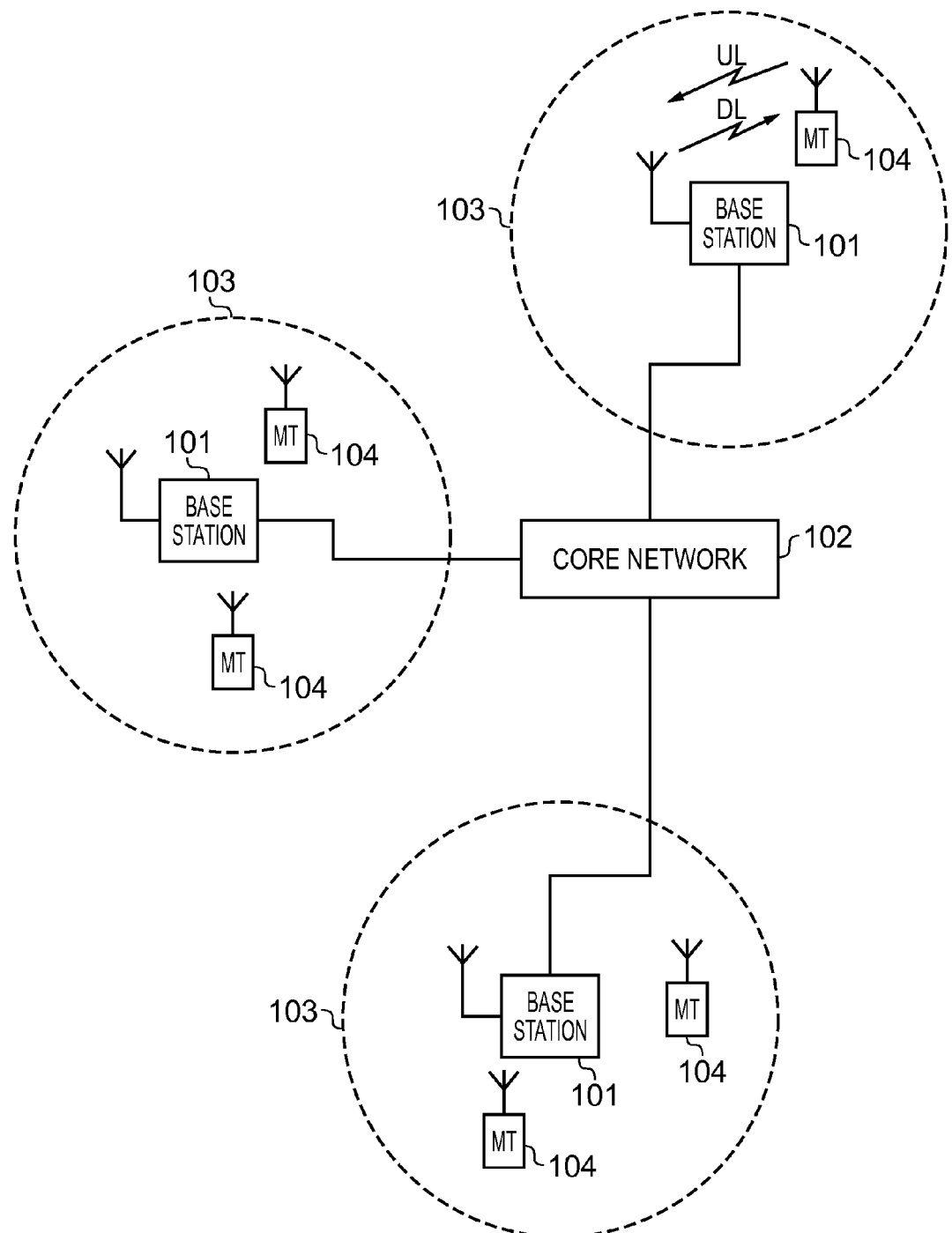
FIG. 1 provides a schematic diagram illustrating an example of a conventional mobile telecommunication network.

FIG. 1 provides a schematic diagram illustrating some basic functionality of a conventional mobile telecommunications network.

The network includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The core network 102 routes data to and from the terminal devices 104 via the respective base stations 101 and provides functions such as authentication, mobility management, charging and so on.

Figure 2:
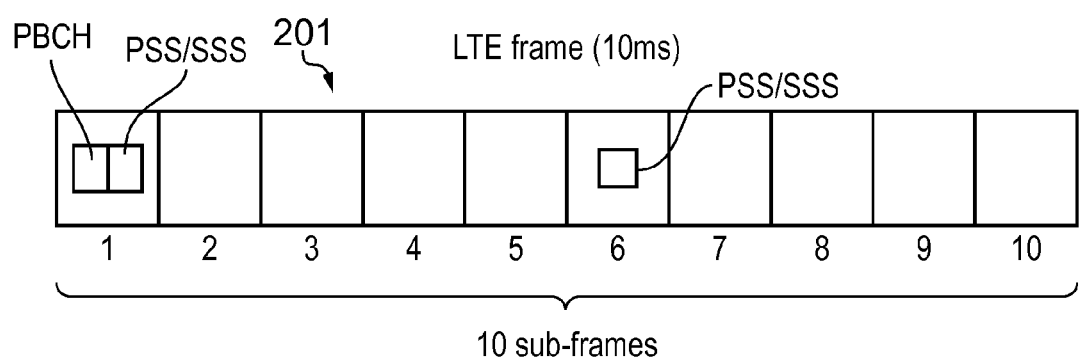
FIG. 2 provides a schematic diagram illustrating a conventional LTE radio frame.

Mobile telecommunications systems such as those arranged in accordance with the 3GPP defined Long Term Evolution (LTE) architecture use an orthogonal frequency division multiplex (OFDM) based interface for the radio downlink (so-called OFDMA) and the radio uplink (so-called SC-FDMA). FIG. 2 shows a schematic diagram illustrating an OFDM based LTE downlink radio frame 201. The LTE downlink radio frame is transmitted from an LTE base station (known as an enhanced Node B) and lasts 10 ms. The downlink radio frame comprises ten sub-frames, each sub-frame lasting 1 ms. A primary synchronisation signal (PSS) and a secondary synchronisation signal (SSS) are transmitted in the first and sixth sub-frames of the LTE frame. A primary broadcast channel (PBCH) is transmitted in the first sub-frame of the LTE frame. The PSS, SSS and PBCH are discussed in more detail below.

Figure 3:
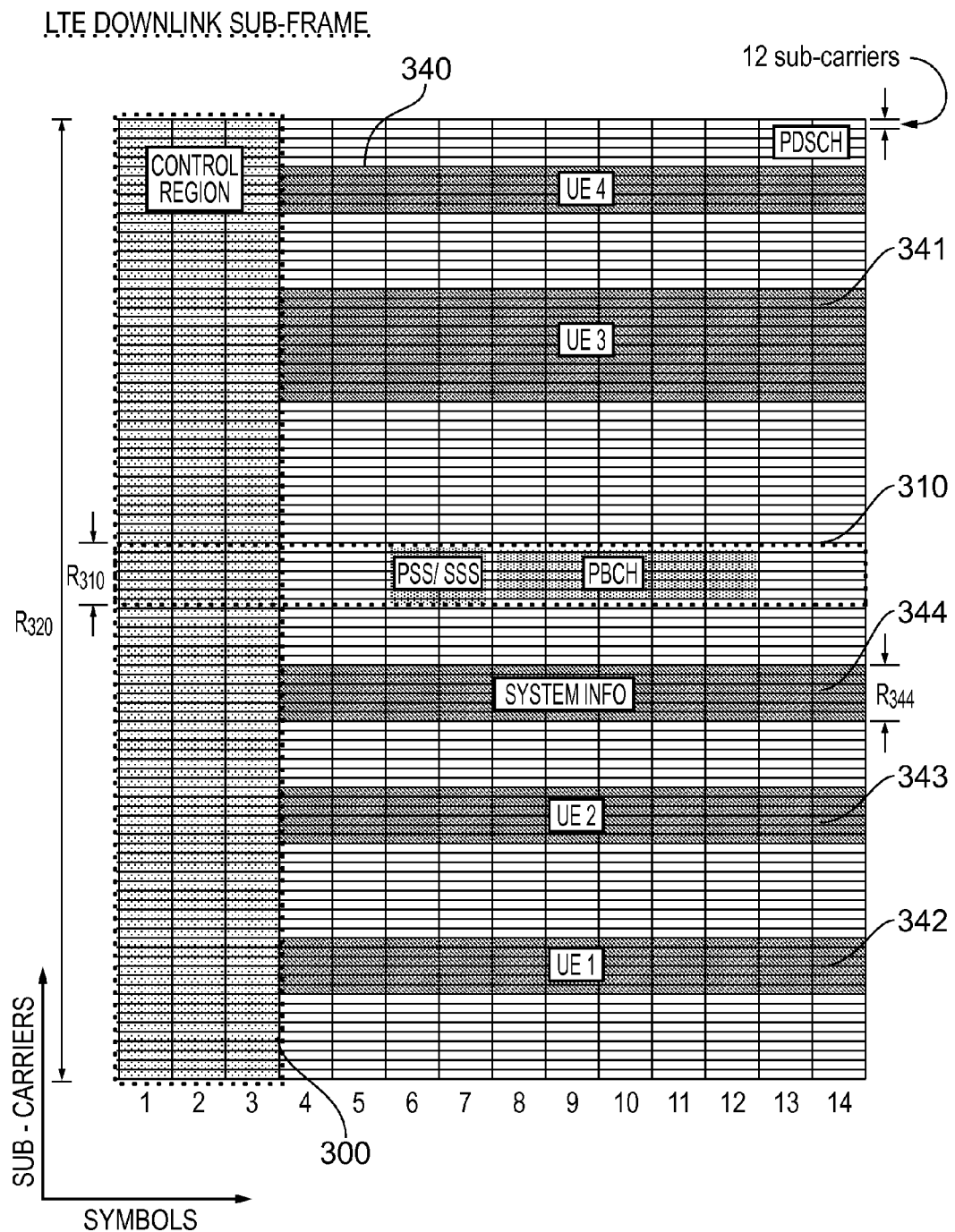
FIG. 3 provides a schematic diagram illustrating an example of a conventional LTE downlink radio sub-frame.

FIG. 3 is a schematic diagram of a grid which illustrates the structure of an example conventional downlink LTE sub-frame. The sub-frame comprises a predetermined number of symbols which are transmitted over a 1 ms period.

Each symbol comprises a predetermined number of orthogonal sub-carriers distributed across the bandwidth of the downlink radio carrier.

The example sub-frame shown in FIG. 3 comprises 14 symbols and 1200 sub-carriers spread across a 20 MHz bandwidth. The smallest allocation of user data for transmission in LTE is a resource block comprising twelve sub-carriers transmitted over one slot (0.5 sub-frame). For clarity, in FIG. 3, each individual resource element is not shown, instead each individual box in the sub-frame grid corresponds to twelve sub-carriers transmitted on one symbol.

FIG. 3 shows in hatching resource allocations for four LTE terminals 340, 341, 342, 343. For example, the resource allocation 342 for a first LTE terminal (UE 1) extends over five blocks of twelve sub-carriers (i.e. 60 sub-carriers), the resource allocation 343 for a second LTE terminal (UE2) extends over six blocks of twelve sub-carriers and so on.

Control channel data is transmitted in a control region 300 (indicated by dotted-shading in FIG. 3) of the sub-frame comprising the first n symbols of the sub-frame where n can vary between one and three symbols for channel bandwidths of 3 MHz or greater and where n can vary between two and four symbols for channel bandwidths of 1.4 MHz. For the sake of providing a concrete example, the following description relates to host carriers with a channel bandwidth of 3 MHz or greater so the maximum value of n will be 3. The data transmitted in the control region 300 includes data transmitted on the physical downlink control channel (PDCCH), the physical control format indicator channel (PCFICH) and the physical HARQ indicator channel (PHICH).

PDCCH contains control data indicating which sub-carriers on which symbols of the sub-frame have been allocated to specific LTE terminals. Thus, the PDCCH data transmitted in the control region 300 of the sub-frame shown in FIG. 3 would indicate that UE1 has been allocated the block of resources identified by reference numeral 342, that UE2 has been allocated the block of resources identified by reference numeral 343, and so on.

PCFICH contains control data indicating the size of the control region (i.e. between one and three symbols).

PHICH contains HARQ (Hybrid Automatic Request) data indicating whether or not previously transmitted uplink data has been successfully received by the network.

Symbols in a central band 310 of the time-frequency resource grid are used for the transmission of information including the primary synchronisation signal (PSS), the secondary synchronisation signal (SSS) and the physical broadcast channel (PBCH). This central band 310 is typically 72 sub-carriers wide (corresponding to a transmission bandwidth of 1.08 MHz). The PSS and SSS are synchronisation signals that once detected allow an LTE terminal device to achieve frame synchronisation and determine the cell identity of the enhanced Node B transmitting the downlink signal. The PBCH carries information about the cell, comprising a master information block (MIB) that includes parameters that LTE terminals use to properly access the cell. Data transmitted to individual LTE terminals on the physical downlink shared channel (PDSCH) can be transmitted in other resource elements of the sub-frame. Further explanation of these channels is provided below. FIG. 3 also shows a region of PDSCH containing system information and extending over a bandwidth of $R_{344}$. A conventional LTE frame will also include reference signals which are discussed further below but not shown in FIG. 3 in the interests of clarity.

The number of sub-carriers in an LTE channel can vary depending on the configuration of the transmission network. Typically this variation is from 72 sub carriers contained within a 1.4 MHz channel bandwidth to 1200 sub-carriers contained within a 20 MHz channel bandwidth (as schematically shown in FIG. 3). As is known in the art, data transmitted on the PDCCH, PCFICH and PHICH is typically distributed on the sub-carriers across the entire bandwidth of the sub-frame to provide for frequency diversity. Therefore a conventional LTE terminal must be able to receive the entire channel bandwidth in order to receive and decode the control region.

Figure 4:
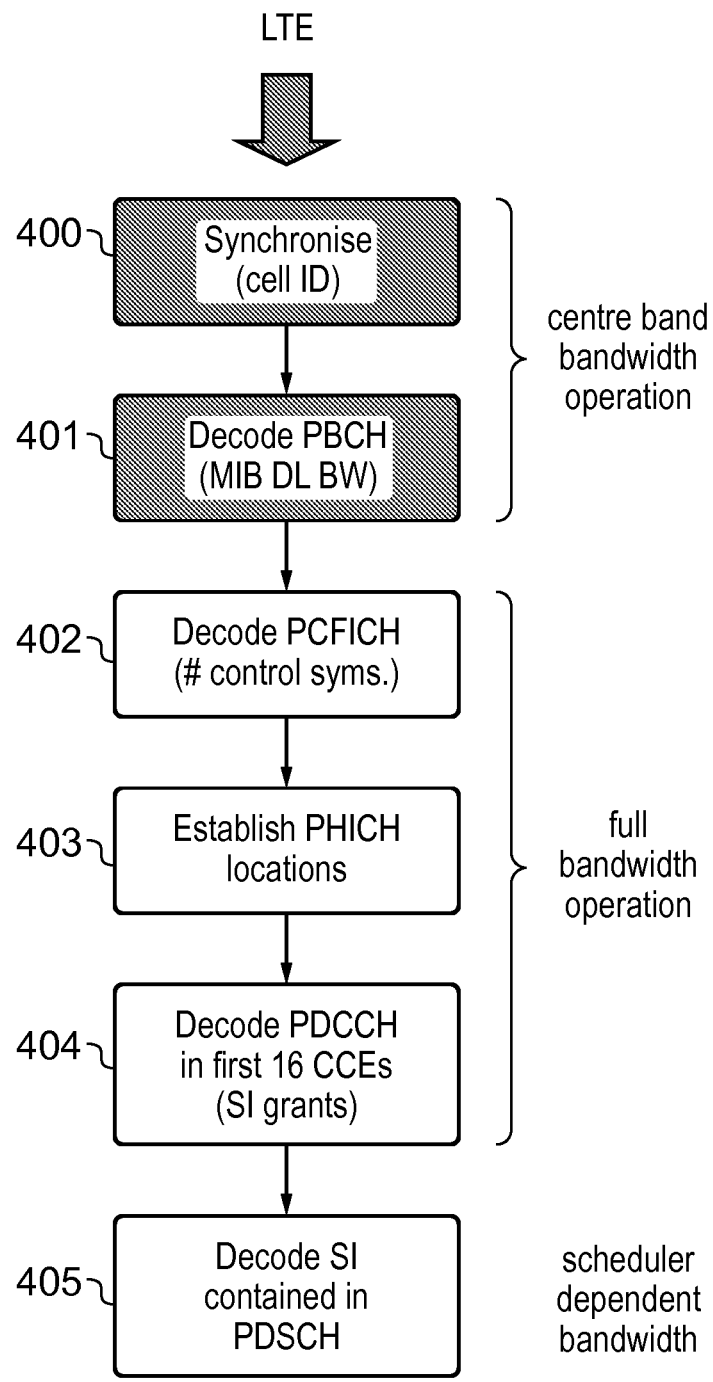
FIG. 4 provides a schematic diagram illustrating a conventional LTE "camp-on" procedure.

FIG. 4 illustrates an LTE "camp-on" process, that is, the process followed by a terminal so that it can decode downlink transmissions which are sent by a base station via a downlink channel. Using this process, the terminal can identify the parts of the transmissions that include system information for the cell and thus decode configuration information for the cell.

As can be seen in FIG. 4, in a conventional LTE camp-on procedure, the terminal first synchronizes with the base station (step 400) using the PSS and SSS in the centre band and then decodes the PBCH (step 401). Once the terminal has performed steps 400 and 401, it is synchronized with the base station.

For each sub-frame, the terminal then decodes the PCFICH which is distributed across the entire bandwidth of carrier 320 (step 402). As discussed above, an LTE downlink carrier can be up to 20 MHz wide (1200 sub-carriers) and an LTE terminal therefore has to have the capability to receive and decode transmissions on a 20 MHz bandwidth in order to decode the PCFICH. At the PCFICH decoding stage, with a 20 MHz carrier band, the terminal operates at a much larger bandwidth (bandwidth of $R_{320}$) than during steps 400 and 401 (bandwidth of $R_{310}$) relating to synchronisation and PBCH decoding.

The terminal then ascertains the PHICH locations (step 403) and decodes the PDCCH (step 404), in particular for identifying system information transmissions and for identifying its personal allocation grants. The allocation grants are used by the terminal to locate system information and to locate its data in the PDSCH. Both system information and personal allocations are transmitted on PDSCH and scheduled within the carrier band 320. Steps 403 and 404 also require the terminal to operate on the entire bandwidth R320 of the carrier band.

At steps 402 to 404, the terminal decodes information contained in the control region 300 of a sub-frame. As explained above, in LTE, the three control channels mentioned above (PCFICH, PHICH and PDCCH) can be found across the control region 300 of the carrier where the control region extends over the range $R_{320}$ and occupies the first one, two or three OFDM symbols of each sub-frame as discussed above. In a sub-frame, typically the control channels do not use all the resource elements within the control region 300, but they are scattered across the entire region, such that a LTE terminal has to be able to simultaneously receive the entire control region 300 for decoding each of the three control channels.

The terminal can then decode the PDSCH (step 405) which contains system information or data transmitted for this terminal.

As explained above, in an LTE sub-frame the PDSCH generally occupies groups of resource elements which are neither in the control region nor in the resource elements occupied by PSS, SSS or PBCH. The data in the blocks of resource elements 340, 341, 342, 343 allocated to the different mobile communication terminals (UEs) shown in FIG. 3 have a smaller bandwidth than the bandwidth of the entire carrier, although to decode these blocks a terminal first receives the PDCCH spread across the frequency range $R_{320}$ to determine if the PDCCH indicates that a PDSCH resource is allocated to the UE and should be decoded. Once a UE has received the entire sub-frame, it can then decode the PDSCH in the relevant frequency range (if any) indicated by the PDCCH. So for example, UE 1 discussed above decodes the whole control region 300 and then the data in the resource block 342.

Virtual Downlink Carrier

Certain classes of devices, such as MTC devices (e.g. semi-autonomous or autonomous wireless communication devices such as smart meters as discussed above), support communication applications that are characterised by the transmission of small amounts of data at relatively infrequent intervals and can thus be considerably less complex than conventional LTE terminals. In many scenarios, providing low capability terminals such as those with a conventional high-performance LTE receiver unit capable of receiving and processing data from an LTE downlink frame across the full carrier bandwidth can be overly complex for a device which only needs to communicate small amounts of data. This may therefore limit the practicality of a widespread deployment of low capability MTC type devices in an LTE network. It is preferable instead to provide low capability terminals such as MTC devices with a simpler receiver unit which is more proportionate with the amount of data likely to be transmitted to the terminal. As set out below, in accordance with examples of the present invention a "virtual carrier" is provided within the transmission resources of a conventional OFDM type downlink carrier (i.e. a "host carrier"). Unlike data transmitted on a conventional OFDM type downlink carrier, data transmitted on the virtual carrier can be received and decoded without needing to process the full bandwidth of the downlink host OFDM carrier. Accordingly, data transmitted on the virtual carrier can be received and decoded using a reduced complexity receiver unit.

Figure 5:
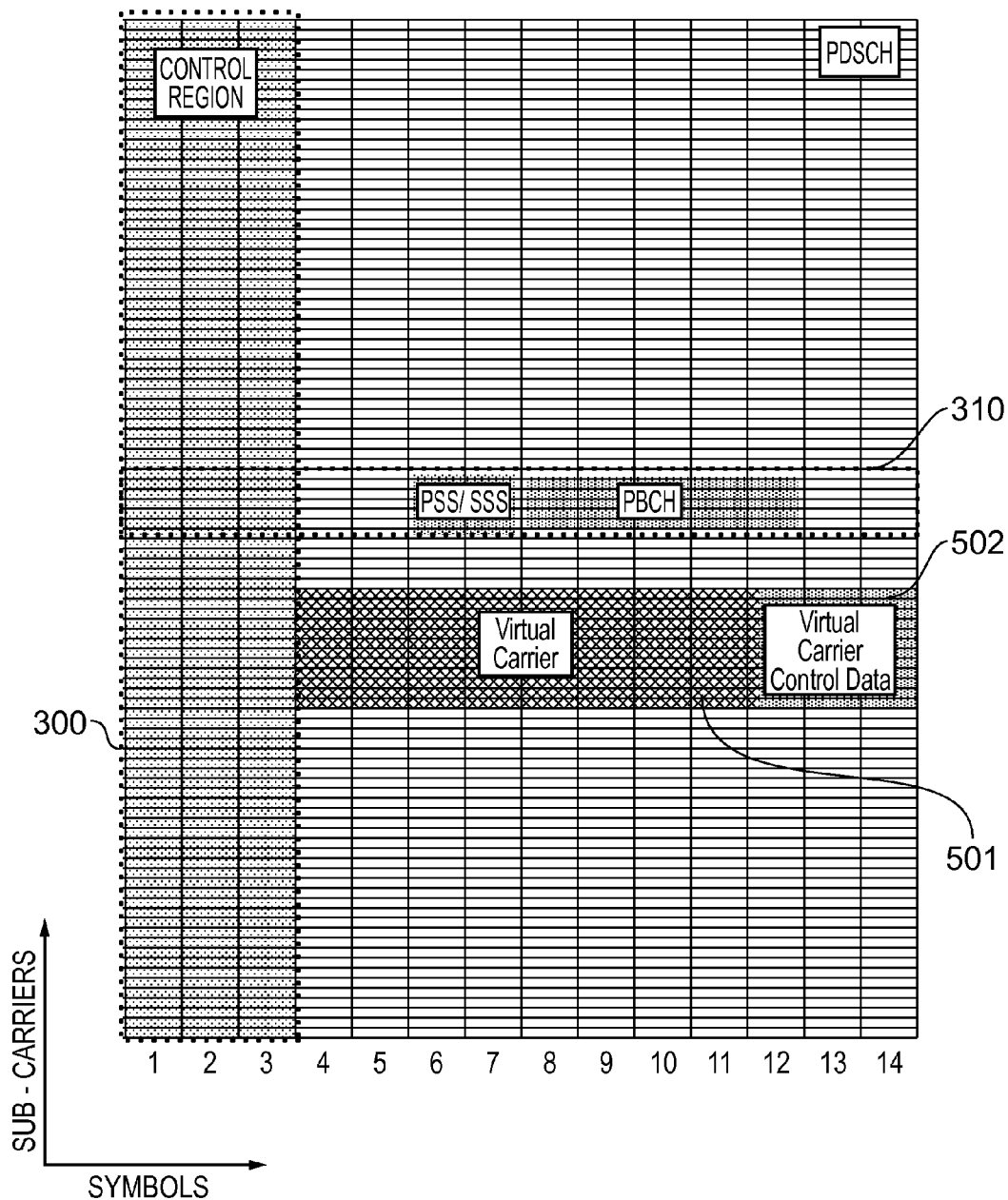
FIG. 5 provides a schematic diagram illustrating an LTE downlink radio sub-frame in which a virtual carrier has been inserted in accordance with an embodiment of the invention.

FIG. 5 provides a schematic diagram illustrating an LTE downlink sub-frame which includes a virtual carrier inserted in a host carrier in accordance with an example of the present invention.

In keeping with a conventional LTE downlink sub-frame, the first n symbols (n is three in FIG. 5) form the control region 300 which is reserved for the transmission of downlink control data such as data transmitted on the PDCCH. However, as can be seen from FIG. 5, outside of the control region 300 the LTE downlink sub-frame includes a group of resource elements positioned in this example below the central band 310 which form a virtual carrier 501. As explained further below, the virtual carrier 501 is adapted so that data transmitted on the virtual carrier 501 can be treated as logically distinct from data transmitted in the remaining parts of the host carrier and can be decoded without decoding all the control data from the control region 300. Although FIG. 5 shows the virtual carrier occupying frequency resources below the centre band, in general the virtual carrier can occupy other frequency resources, for example, above the centre band or including the centre band. If the virtual carrier is configured to overlap any resources used by the PSS, SSS or PBCH of the host carrier, or any other signal transmitted by the host carrier that a terminal device operating on the host carrier would require for correct operation and expect to find in a known pre-determined location, the signals on the virtual carrier can be arranged such that these aspects of the host carrier signal are maintained.

As can be seen from FIG. 5, data transmitted on the virtual carrier 501 is transmitted across a limited bandwidth. This might be any suitable bandwidth smaller than that of the host carrier. In the example shown in FIG. 5 the virtual carrier is transmitted across a bandwidth comprising 12 blocks of 12 sub-carriers (i.e. 144 sub-carriers), which is equivalent to a 2.16 MHz transmission bandwidth. Accordingly, a terminal using the virtual carrier need only be equipped with a receiver capable of receiving and processing data transmitted over a bandwidth of 2.16 MHz. This enables low capability terminals (for example MTC type terminals) to be provided with simplified receiver units yet still be able to operate within an OFDM type communication network which, as explained above, conventionally requires terminals to be equipped with receivers capable of receiving and processing an OFDM signal across the entire bandwidth of the signal.

As explained above, in OFDM-based mobile communication systems such as LTE, downlink data is dynamically assigned to be transmitted on different sub-carriers on a sub-frame by sub-frame basis. Accordingly, in every sub-frame the network signals which sub-carriers on which symbols contain data relevant to which terminals (i.e. downlink grant signalling).

As can be seen from FIG. 3, in a conventional downlink LTE sub-frame this information is transmitted on the PDCCH during the first symbol or symbols of the sub-frame. However, as previously explained, the information transmitted in the PDCCH is spread across the entire bandwidth of the sub-frame and therefore cannot be received by a mobile communication terminal with a simplified receiver unit capable only of receiving the reduced bandwidth virtual carrier.

Accordingly, as can be seen in FIG. 5, the final symbols of the virtual carrier can be reserved as a control region 502 for the virtual carrier for the transmission of control data indicating which resource elements of the virtual carrier 501 have been allocated to user equipment (UEs) using the virtual carrier. In some examples the number of symbols comprising the virtual carrier control region 502 might be fixed, for example three symbols. In other examples the virtual carrier control region 502 can vary in size, for example between one and three symbols, as with the control region 300.

The virtual carrier control region can be located at any suitable position, for example in the first few symbols of the virtual carrier. In the example of FIG. 5 this could mean positioning the virtual carrier control region on the fourth, fifth and sixth symbols. However, fixing the position of the virtual carrier control region in the final symbols of the sub-frame can be useful because the position of the virtual carrier control region will not vary in dependence on the number of symbols of the host carrier control region 300. This can help simplify the processing undertaken by mobile communication terminals receiving data on the virtual carrier because there is no need for terminals to determine a position of the virtual carrier control region every sub-frame if it is known that it will always be positioned in the final n symbols of the sub-frame.

In a further embodiment, the virtual carrier control symbols may reference virtual carrier PDSCH transmissions in a separate sub-frame.

In some examples the virtual carrier may be located within the centre band 310 of the downlink sub-frame. This can help reduce the impact on host carrier PDSCH resources caused by the introduction of the virtual carrier within the host carrier bandwidth since the resources occupied by the PSS/SSS and PBCH would be contained within the virtual carrier region and not the remaining host carrier PDSCH region. Therefore, depending on for example the expected virtual carrier throughput, the location of a virtual carrier can be appropriately chosen to either exist inside or outside the centre band according to whether the host or virtual carrier is chosen to bear the overhead of the PSS, SSS and PBCH.

Virtual Carrier "Camp-On" Process

As explained above, before a conventional LTE terminal can begin transmitting and receiving data in a cell, it first camps on to the cell. An adapted camp-on process can be provided for terminals using the virtual carrier.

Figure 6:
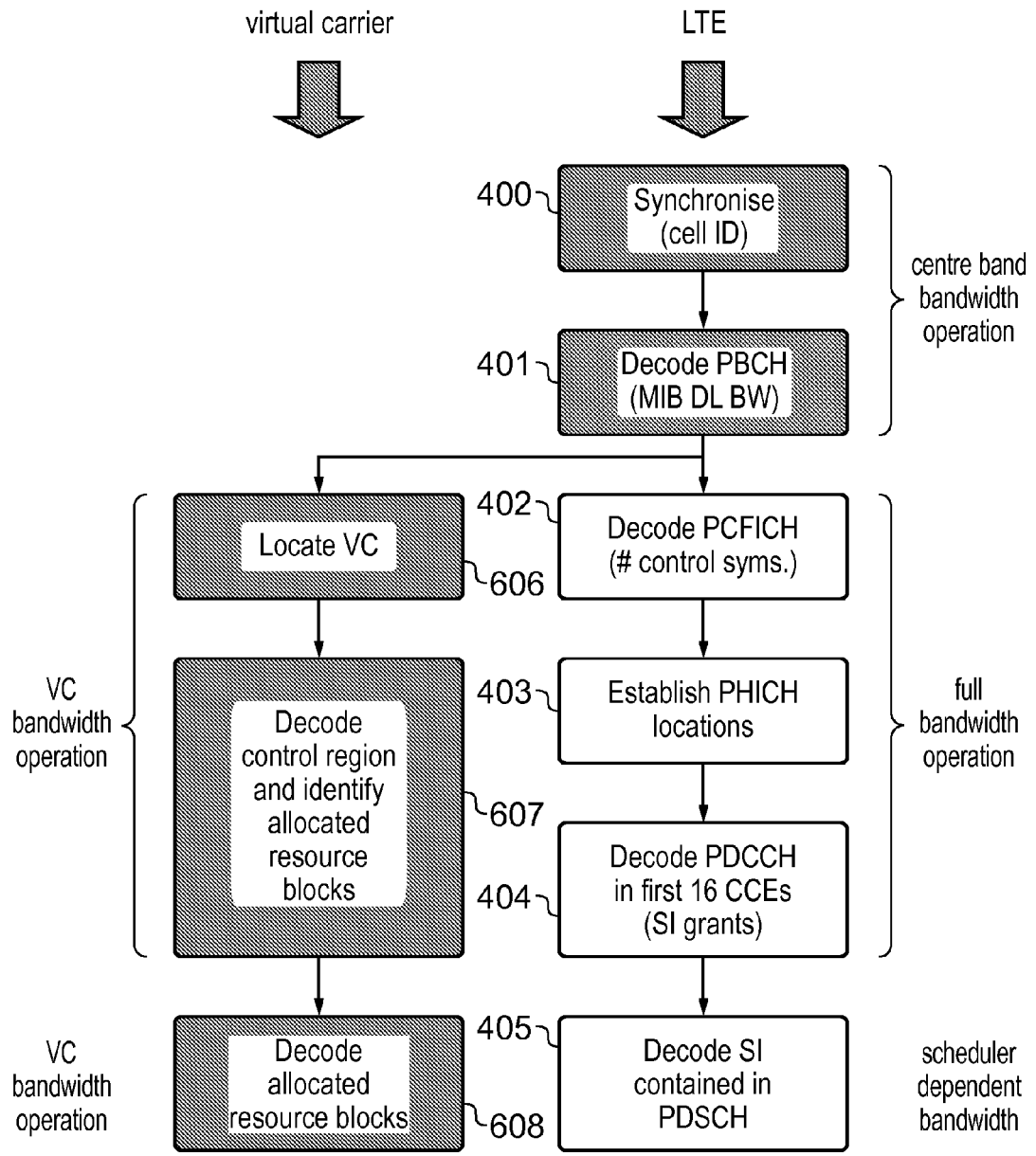
FIG. 6 provides a schematic diagram illustrating an adapted LTE "camp-on" procedure for camping on to a virtual carrier.

FIG. 6 shows a flow diagram schematically illustrating a camp-on process according to an example of the present invention. There are two branches shown in FIG. 6. Different steps of the process associated with a UE intending to use the virtual carrier are shown under the general heading "virtual carrier". The steps shown under the general heading "legacy LTE" are associated with a UE intending to use the host carrier, and these steps correspond to the steps of FIG. 4. In this example, the first two steps 400, 401 of the camp-on procedure are common to both the virtual carrier and host (legacy LTE) carrier.

The virtual carrier camp-on process is explained with reference to the example sub-frame shown in FIG. 5 in which a virtual carrier with a bandwidth of 144 sub-carriers is inserted within the operating bandwidth of a host carrier with a bandwidth corresponding to 1200 sub-carriers. As discussed above, a terminal having a receiver unit with an operational bandwidth of less than that of the host carrier cannot fully decode data in the control region of sub-frames of the host carrier. However, a receiver unit of a terminal having an operational bandwidth of only twelve blocks of twelve sub-carriers (i.e. 2.16 MHz) can receive control and user data transmitted on this example virtual carrier 502.

As noted above, in the example of FIG. 6, the first steps 400 and 401 for a virtual carrier terminal are the same as the conventional camp-on process shown in FIG. 4, although a virtual carrier terminal may extract additional information from the MIB as described below. Both types of terminals (i.e. virtual carrier terminals and host/legacy carrier terminals) can use the PSS/SSS and PBCH to synchronize with the base station using the information carried on the 72 sub-carrier centre band within the host carrier. However, where the conventional LTE terminals then continue with the process by performing the PCFICH decoding step 402, which requires a receiver unit capable of receiving and decoding the host carrier control region 300, a terminal camping on to the cell to receive data on the virtual carrier (which may be referred to as a "virtual carrier terminal") performs steps 606 and 607 instead.

In a further embodiment of the present invention a separate synchronisation and PBCH functionality can be provided for the virtual carrier device as opposed to re-using the same conventional initial camp-on processes of steps 400 and 401 of the host carrier device.

Figure 7:
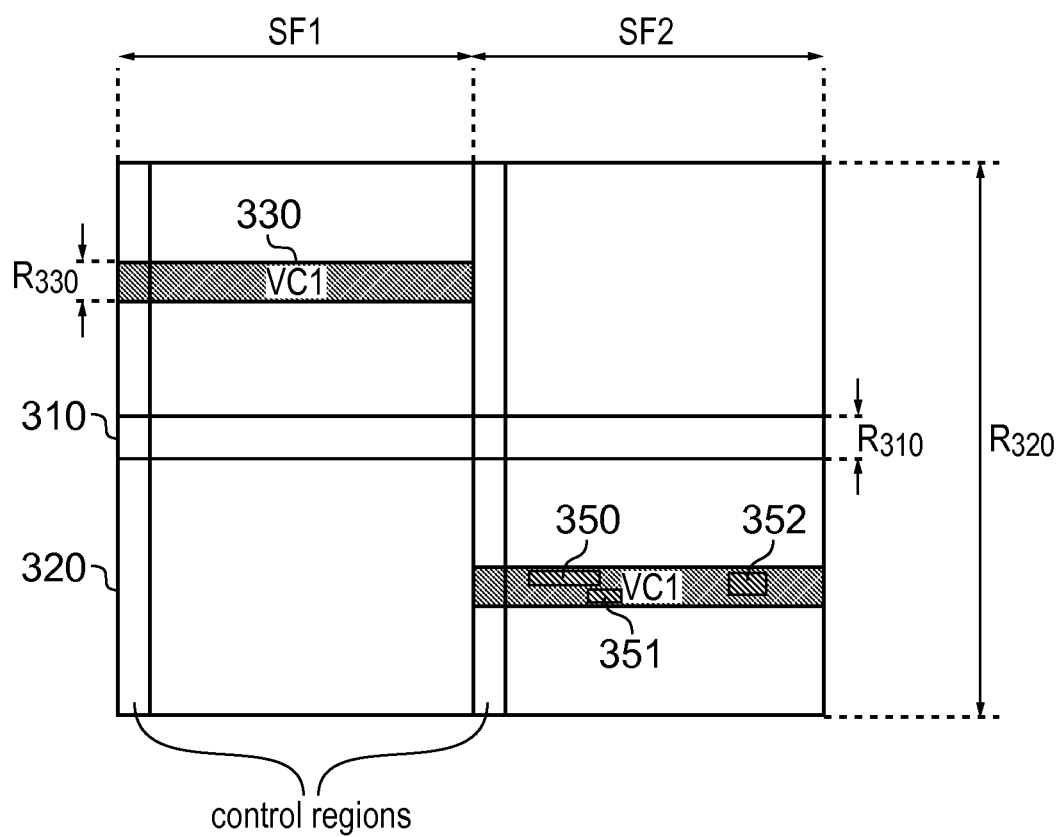
FIG. 7 provides a schematic diagram illustrating LTE downlink radio sub-frames in accordance with an embodiment of the present invention.

At step 606, the virtual carrier terminal locates a virtual carrier, if any is provided within the host carrier, using a virtual carrier-specific step. Various examples of how this step may be performed are discussed further below. Once the virtual carrier terminal has located a virtual carrier, it can access information within the virtual carrier. For example, if the virtual carrier mirrors the conventional LTE resource allocation method, the virtual carrier terminal may proceed to decode control portions within the virtual carrier, which can, for example, indicate which resource elements within the virtual carrier have been allocated for a specific virtual carrier terminal or for system information. For example, FIG. 7 shows the blocks of resource elements 350 to 352 within virtual carrier 330 that have been allocated for the sub-frame SF2. However, there is no requirement for the virtual carrier terminal to follow or mirror the conventional LTE process (e.g. steps 402-404) and these steps may for example be implemented very differently for a virtual carrier camp-on process.

Regardless of the virtual carrier terminal following a LTE-like step or a different type of step when performing step 607, the virtual carrier terminal can then decode the allocated resource elements at step 608 and thereby receive data transmitted by the base station broadcasting the virtual carrier. The data decoded in step 608 may include, for example, the remainder of the system information containing details of the network configuration.

Even though the virtual carrier terminal does not have the bandwidth capabilities to decode and receive downlink data if it was transmitted in the host carrier using conventional LTE, it can still access a virtual carrier within the host carrier having a limited bandwidth whilst re-using the initial LTE steps. Step 608 may also be implemented in a LTE-like manner or in a different manner. For example, multiple virtual carrier terminals may share a virtual carrier and have grants allocated to manage the virtual carrier sharing as shown in SF2 in FIG. 7, or, in another example, a virtual carrier terminal may have the entire virtual carrier allocated for its own downlink transmissions, or the virtual carrier may be entirely allocated to a virtual carrier terminal for a certain number of sub-frame only, etc.

There is thus a large degree of flexibility provided for the virtual carrier camp-on process. There is, for example, the ability to adjust a balance between re-using or mirroring conventional LTE steps or processes, thereby reducing the terminal complexity and the need to implement new elements, and adding new virtual carrier specific aspects or implementations, thereby potentially optimizing the use of narrow-band virtual carriers, as LTE has been designed with the larger-band host carriers in mind.

Downlink Virtual Carrier Detection

As discussed above, the virtual carrier terminal should locate (within the time-frequency resource grid of the host carrier) the virtual carrier before it can receive and decode transmissions on the virtual carrier. Several alternatives are available for the virtual carrier presence and location determination, which can be implemented separately or in combination. Some of these options are discussed below.

To facilitate the virtual carrier detection, the virtual carrier location information may be provided to the virtual carrier terminal such that it can locate the virtual carrier, if any exists, more easily. For example, such location information may comprise an indication that one or more virtual carriers are provided within the host carrier, or that the host carrier does not currently provide any virtual carrier. It may also comprise an indication of the virtual carrier's bandwidth, for example in MHz or blocks of resource elements. Alternatively, or in combination, the virtual carrier location information may comprise the virtual carrier's centre frequency and bandwidth, thereby giving the virtual carrier terminal the location and bandwidth of any active virtual carrier. In the event the virtual carrier is to be found at a different frequency position in each sub-frame, according, for example, to a pseudo-random hopping algorithm, the location information can, for example, indicate a pseudo random parameter. Such parameters may include a starting frame and parameters used for the pseudo-random algorithm. Using these pseudo-random parameters, the virtual carrier terminal can then know where the virtual carrier can be found for any sub-frame.

Figure 8:
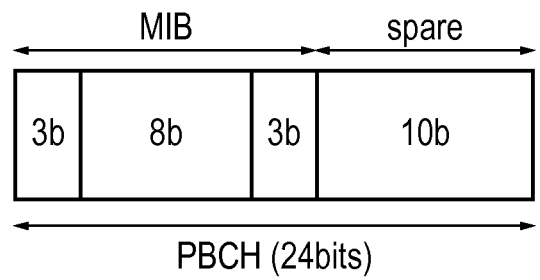
FIG. 8 provides a schematic diagram illustrating a physical broadcast channel (PBCH)
Figure 9:
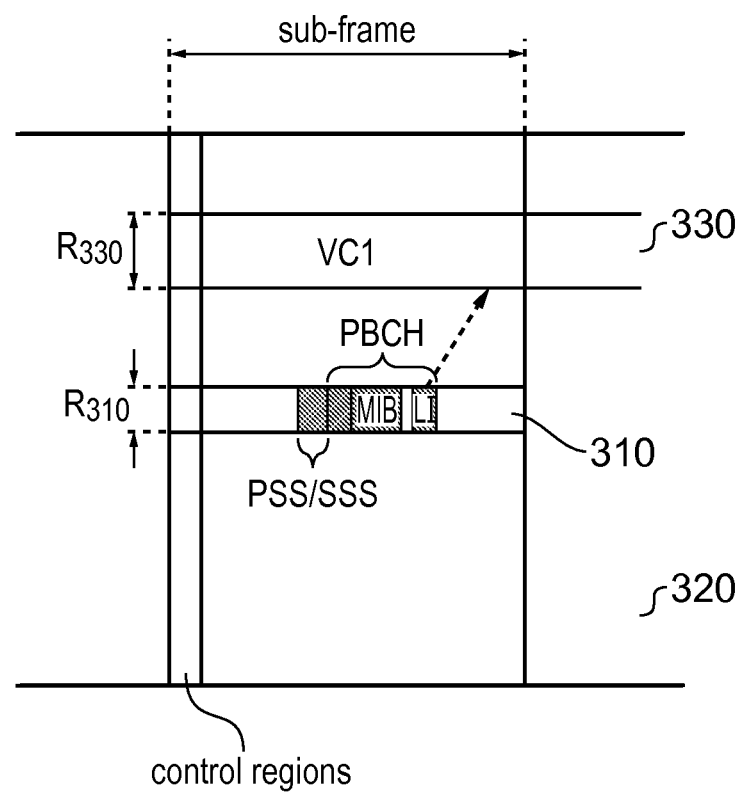
FIG. 9 provides a schematic diagram illustrating an LTE downlink radio sub-frame in accordance with an embodiment of the present invention.

On implementation feature associated with little change to the virtual carrier terminal (as compared with a conventional LTE terminal) would be to include location information for the virtual carrier within the PBCH, which already carries the Master Information Block, or MIB in the host carrier centre band. As shown in FIG. 8, the MIB consists of 24 bits (3 bits to indicate DL bandwidth, 8 bits to indicate the System Frame Number or SFN, and 3 bits regarding the PHICH configuration). The MIB therefore comprises 10 spare bits that can be used to carry location information in respect of one or more virtual carriers. For example, FIG. 9 shows an example where the PBCH includes the MIB and location information ("LI") for pointing any virtual carrier terminal to a virtual carrier.

Alternatively, virtual carrier location information could be provided in the centre band, outside of the PBCH. It can for example be always provided after and adjacent to the PBCH. By providing the location information in the centre band but outside of the PBCH, the conventional PBCH is not modified for the purpose of using virtual carriers, but a virtual carrier terminal can easily find the location information in order to detect the virtual carrier, if any.

The virtual carrier location information, if provided, can be provided elsewhere in the host carrier, but it may be advantageous to provide it in the centre band, for example because a virtual carrier terminal may configure its receiver to operate on the centre band and the virtual carrier terminal then does not need to adjust its receiver settings for finding the location information.

Depending on the amount of virtual carrier location information provided, the virtual carrier terminal can either adjust its receiver to receive the virtual carrier transmissions, or it may require further location information before it can do so.

If for example, the virtual carrier terminal was provided with location information indicating a virtual carrier presence and/or a virtual carrier bandwidth but not indicating any details as to the exact virtual carrier frequency range, or if the virtual carrier terminal was not provided with any location information, the virtual carrier terminal could then scan the host carrier for a virtual carrier (e.g. performing a so-called blind search process). Scanning the host carrier for a virtual carrier can be based on different approaches, some of which will be presented below.

Figure 10:
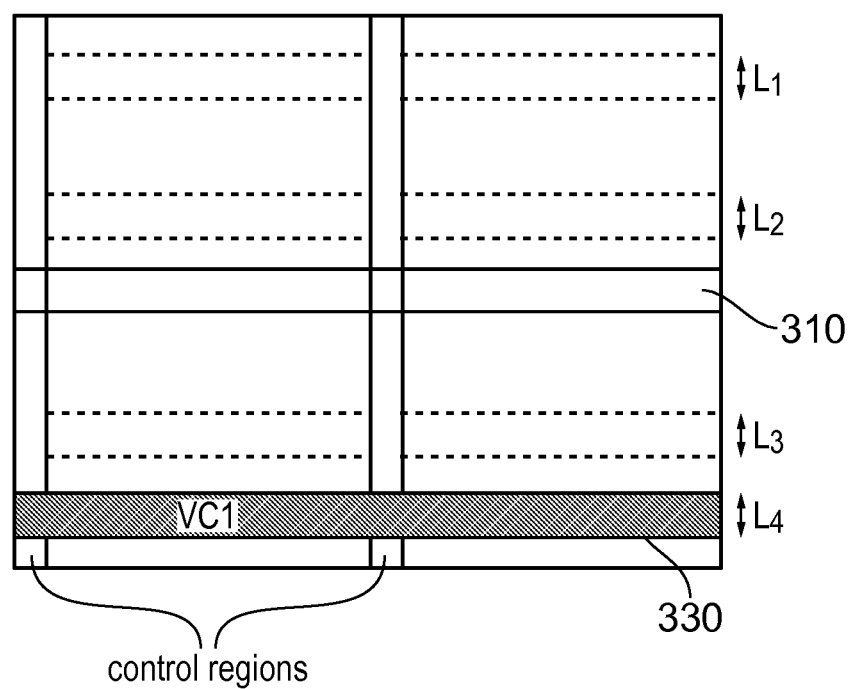
FIG. 10 provides a schematic diagram illustrating an LTE downlink radio sub-frame in which a virtual carrier has been inserted in accordance with an embodiment of the invention.
Figure 11A:
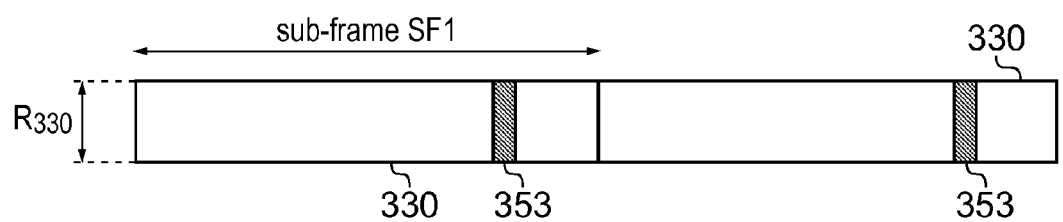
FIGS. 11A to 11D provide schematic diagrams illustrating positioning of location signals within a LTE downlink sub-frame according to embodiments of the present invention.
Figure 11B:
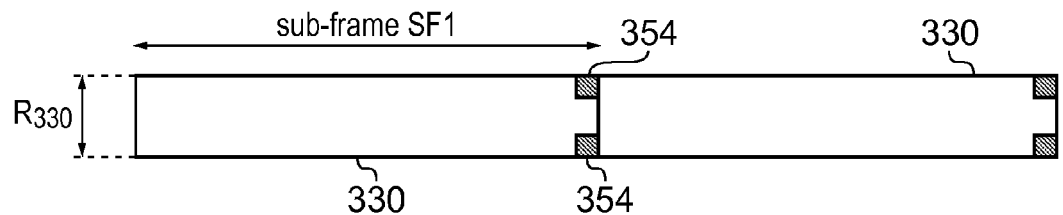
Figure 11C:
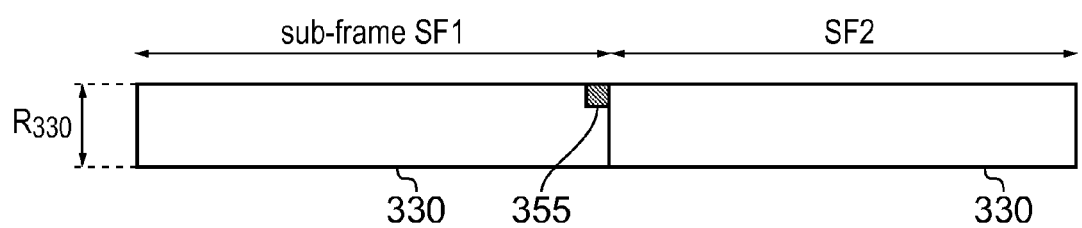

According to a first approach, a virtual carrier might only be inserted in certain pre-determined locations, as illustrated for example in FIG. 10 for a four-location example. The virtual carrier terminal then scans the four locations L1-L4 for any virtual carrier. If and when the virtual carrier terminal detects a virtual carrier, it can then "camp-on" the virtual carrier to receive downlink data as described above. In this approach, the virtual carrier terminal may be provided with the possible virtual carrier locations in advance, for example they may be stored as a network-specific setting in an internal memory. Detection of a virtual carrier could be accomplished by seeking to decode a particular physical channel on the virtual carrier. The successful decoding of such a channel, indicated for example by a successful cyclic redundancy check (CRC) on decoded data, would indicate the successful location of the virtual carrier According to a second approach, the virtual carrier may include location signals such that a virtual carrier terminal scanning the host carrier can detect such signals to identify the presence of a virtual carrier. Examples of possible location signals are illustrated in FIGS. 11A to 11D. In the examples of FIGS. 11A to 11C, the virtual carrier regularly sends an arbitrary location signal such that a terminal scanning a frequency range where the location signal is would detect this signal. An "arbitrary" signal is intended here to include any signal that does not carry any information as such, or is not meant to be interpreted, but merely includes a specific signal or pattern that a virtual carrier terminal can detect. This can for example be a series of positive bits across the entire location signal, an alternation of 0 and 1 across the location signal, or any other suitable arbitrary signal. It is noteworthy that the location signal may be made of adjacent blocks of resource elements or may be formed of non adjacent blocks. For example, it may be located at every other block of resource elements at the "top" (i.e. upper frequency limit) of the virtual carrier.

In the example of FIG. 11A, the location signal 353 extends across the range $R_{330}$ of the virtual carrier 330 and is always found at the same position in the virtual carrier within a sub-frame. If the virtual carrier terminal knows where to look for a location signal in a virtual carrier sub-frame, it can then simplify its scanning process by only scanning this position within a sub-frame for a location signal. FIG. 11B shows a similar example where every sub-frame includes a location signal 354 comprising two parts: one at the top corner and one at the bottom corner of the virtual carrier sub-frame, at the end of this sub-frame. Such a location signal may be useful if, for example, the virtual carrier terminal does not know the bandwidth of the virtual carrier in advance as it can facilitate a clear detection of the top and bottom frequency edges of the virtual carrier band.

In the example of FIG. 11C, a location signal 355 is provided in a first sub-frame SF1, but not in a second sub-frame SF2. The location signal can for example be provided every two sub-frames. The frequency of the location signals can be chosen to adjust a balance between reducing scanning time and reducing overhead. In other words, the more often the location signal is provided, the less long it takes a terminal to detect a virtual carrier but the more overhead there is.

Figure 11D:
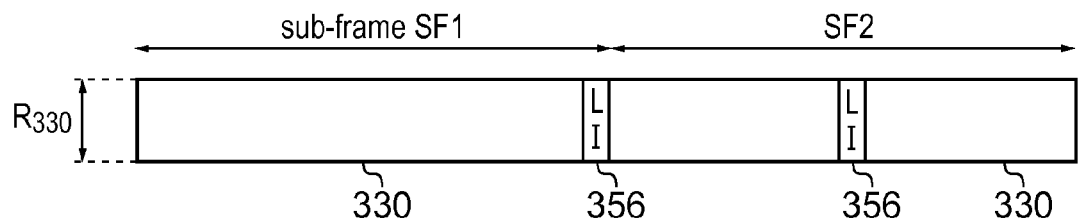

In the example of FIG. 11D, a location signal is provided where this location signal is not an arbitrary signal as in FIGS. 11A to 11C, but is a signal that includes information for virtual carrier terminals. The virtual carrier terminals can detect this signal when they scan for a virtual carrier and the signal may include information in respect of, for example, the virtual carrier bandwidth or any other virtual carrier-related information (location or non-location information). When detecting this signal, the virtual carrier terminal can thereby detect the presence and location of the virtual carrier. As shown in FIG. 11D, the location signal can, like an arbitrary location signal, be found at different locations within the sub-frame, and the location may vary on a per-sub-frame basis.

Dynamic Variation of Control Region Size of Host Carrier

As explained above, in LTE the number of symbols that make up the control region of a downlink sub-frame varies dynamically depending on the quantity of control data that needs to be transmitted. Typically, this variation is between one and three symbols. As will be understood with reference to FIG. 5, variation in the width of the host carrier control region will cause a corresponding variance in the number of symbols available for the virtual carrier. For example, as can be seen in FIG. 5, when the control region is three symbols in length and there are 14 symbols in the sub-frame, the virtual carrier is eleven symbols long. However, if in the next sub-frame the control region of the host carrier were reduced to one symbol, there would be thirteen symbols available for the virtual carrier in that sub-frame.

When a virtual carrier is inserted into a LTE host carrier, mobile communication terminals receiving data on the virtual carrier need to be able to determine the number of symbols in the control region of each host carrier sub-frame to determine the number of symbols in the virtual carrier in that sub-frame if they are to be able to use all available symbols that are not used by the host carrier control region.

Conventionally, the number of symbols forming the control region is signalled in the first symbol of every sub-frame in the PCFICH. However, the PCFICH is typically distributed across the entire bandwidth of the downlink LTE sub-frame and is therefore transmitted on sub-carriers which virtual carrier terminals capable only of receiving the virtual carrier cannot receive. Accordingly, in one embodiment, any symbols across which the control region could possibly extend are predefined as null symbols on the virtual carrier, i.e. the length of the virtual sub-carrier is set at (m-n) symbols, where m is the total number of symbols in a sub-frame and n is the maximum number of symbols of the control region. Thus, resource elements are never allocated for downlink data transmission on the virtual carrier during the first n symbols of any given sub-frame.

Although this embodiment is simple to implement it will be spectrally inefficient because during sub-frames when the control region of the host carrier has fewer than the maximum number of symbols, there will be unused symbols in the virtual carrier.

In another embodiment, the number of symbols in the control region of the host carrier is explicitly signalled in the virtual carrier itself. Once the number of symbols in the control region of the host carrier is known, the number of symbols in the virtual carrier can be calculated by subtracting the total number of symbols in the sub-frame from this number.

In one example an explicit indication of the host carrier control region size is given by certain information bits in the virtual carrier control region. In other words an explicit signalling message is inserted at a predefined position in the virtual carrier control region 502. This predefined position is known by each terminal adapted to receive data on the virtual carrier.

In another example, the virtual carrier includes a predefined signal, the location of which indicates the number of symbols in the control region of the host carriers. For example, a predefined signal could be transmitted on one of three predetermined blocks of resource elements. When a terminal receives the sub-frame it scans for the predefined signal. If the predefined signal is found in the first block of resource elements this indicates that the control region of the host carrier comprises one symbol; if the predefined signal is found in the second block of resource elements this indicates that the control region of the host carrier comprises two symbols and if the predefined signal is found in the third block of resource elements this indicates that the control region of the host carrier comprises three symbols.

In another example, the virtual carrier terminal is arranged to first attempt to decode the virtual carrier assuming that the control region size of the host carrier is one symbol. If this is not successful, the virtual carrier terminal attempts to decode the virtual carrier assuming that the control region size of the host carrier is two and so on, until the virtual carrier terminal successfully decodes the virtual carrier.

Downlink Virtual Carrier Reference Signals

As is known in the art, in OFDM-based transmission systems, such as LTE, a number of sub-carriers in symbols throughout the sub-frames are typically reserved for the transmission of reference signals. The reference signals are transmitted on sub-carriers distributed throughout a sub-frame across the channel bandwidth and across the OFDM symbols. The reference signals are arranged in a repeating pattern and can be used by a receiver to estimate the channel function applied to the data transmitted on each sub-carrier using extrapolation and interpolation techniques. These reference signals are also typically used for additional purposes such as determining metrics for received signal power indications, automatic frequency control metrics and automatic gain control metrics. In LTE the positions of the reference signal bearing sub-carriers within each sub-frame are pre-defined and are therefore known at the receiver of each terminal.

In LTE downlink sub-frames, reference signals from each transmit antenna port are typically inserted on every sixth sub-carrier. Accordingly, if a virtual carrier is inserted in an LTE downlink sub-frame, even if the virtual carrier has a minimum bandwidth of one resource block (i.e. twelve sub-carriers) the virtual carrier will include at least some reference signal bearing sub-carriers.

There are sufficient reference signal bearing sub-carriers provided in each sub-frame such that a receiver need not accurately receive every single reference signal to decode the data transmitted on the sub-frame. However, as will be understood the more reference signals that are received, the better a receiver will generally be able to estimate the channel response, and hence fewer errors will typically be introduced into the data decoded from the sub-frame. Accordingly, in order to preserve compatibility with LTE communication terminals receiving data on the host carrier, in accordance with some examples of the present invention, the sub-carrier positions that would contain reference signals in a conventional LTE sub-frame are retained in the virtual carrier.

As will be understood, in accordance with examples of the present invention, terminals arranged to receive only the virtual carrier receive a reduced number of sub-carriers compared to conventional LTE terminals which receive each sub-frame across the entire bandwidth of the sub-frame. As a result, the reduced capability terminals receive fewer reference signals over a narrower range of frequencies which may result in a less accurate channel estimation being generated.

In some examples a simplified virtual carrier terminal may have a lower mobility which requires fewer reference symbols to support channel estimation. However, in some examples of the present invention the downlink virtual carrier includes additional reference signal bearing sub-carriers to enhance the accuracy of the channel estimation that the reduced capability terminals can generate.

In some examples the positions of the additional reference bearing sub-carriers are such that they are systematically interspersed with respect to the positions of the conventional reference signal bearing sub-carriers thereby increasing the sampling frequency of the channel estimation when combined with the reference signals from the existing reference signal bearing sub-carriers. This allows an improved channel estimation of the channel to be generated by the reduced capability terminals across the bandwidth of the virtual carrier. In other examples, the positions of the additional reference bearing sub-carriers are such that they are systematically placed at the edge of the bandwidth of the virtual carrier thereby increasing the interpolation accuracy of the virtual carrier channel estimates.

Alternative Virtual Carrier Arrangements

Figure 12:
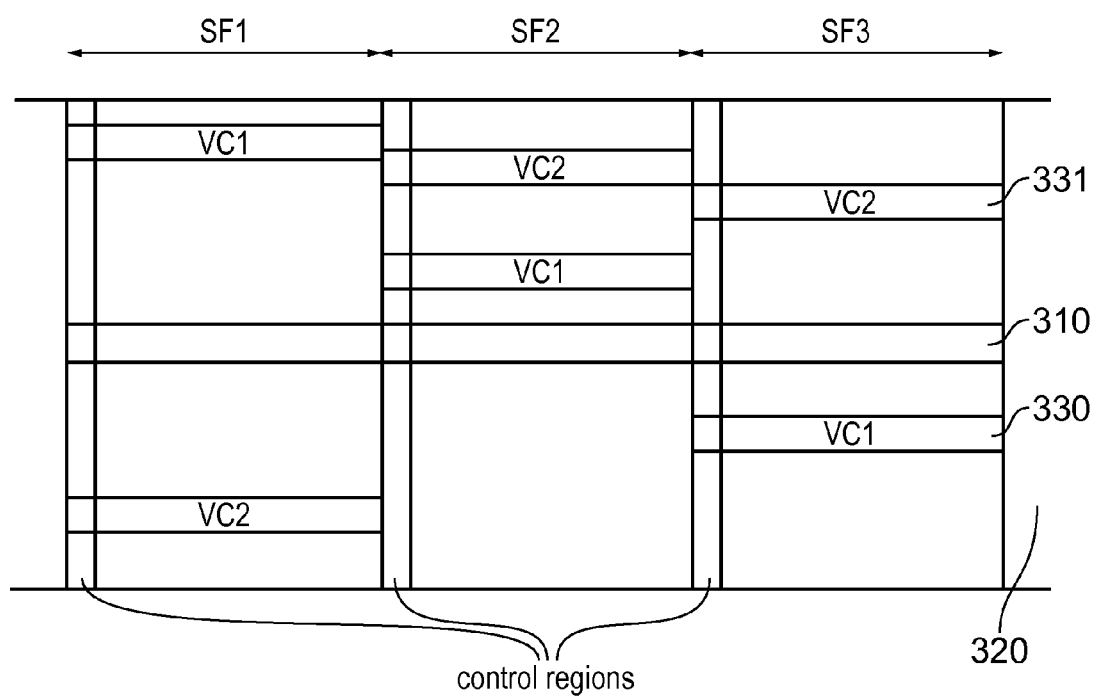
FIG. 12 provides a schematic diagram illustrating a group of sub-frames in which two virtual carriers change location within a host carrier band according to an embodiment of the present invention.

So far examples of the invention have been described generally in terms of a host carrier in which a single virtual carrier has been inserted as shown for example in FIG. 5. However, in some examples a host carrier may include more than one virtual carrier as shown for example in FIG. 12. FIG. 12 shows an example in which two virtual carriers VC1 (330) and VC2 (331) are provided within a host carrier 320. In this example, the two virtual carriers change location within the host carrier band according to a pseudo-random algorithm. However, in other examples, one or both of the two virtual carriers may always be found in the same frequency range within the host carrier frequency range and/or may change position according to a different mechanism. In LTE, the number of virtual carriers within a host carrier is only limited by the size of the host carrier. However, too many virtual carriers within the host carrier may unduly limit the bandwidth available for transmitting data to conventional LTE terminals and an operator may therefore decide on a number of virtual carrier within a host carrier according to, for example, a ratio of conventional LTE users/virtual carrier users.

In some examples the number of active virtual carriers can be dynamically adjusted such that it fits the current needs of conventional LTE terminals and virtual carrier terminals. For example, if no virtual carrier terminal is connected or if their access is to be intentionally limited, the network can arrange to begin scheduling the transmission of data to LTE terminals within the sub-carriers previously reserved for the virtual carrier. This process can be reversed if the number of active virtual carrier terminals begins to increase. In some examples the number of virtual carriers provided may be increased in response to an increase in the presence of virtual carrier terminals. For example if the number of virtual terminals present in a network or area of a network exceeds a threshold value, an additional virtual carrier is inserted in the host carrier. The network elements and/or network operator can thus activate or deactivate the virtual carriers whenever appropriate.

The virtual carrier shown for example in FIG. 5 is 144 sub-carriers in bandwidth. However, in other examples a virtual carrier may be of any size between twelve sub-carriers to 1188 sub-carriers (for a carrier with a 1200 sub-carrier transmission bandwidth). Because in LTE the centre band has a bandwidth of 72 sub-carriers, a virtual carrier terminal in an LTE environment preferentially has a receiver bandwidth of at least 72 sub-carriers (1.08 MHz) such that it can decode the centre band 310, therefore a 72 sub-carrier virtual carrier may provide a convenient implementation option. With a virtual carrier comprising 72 sub-carriers, the virtual carrier terminal does not have to adjust the receiver's bandwidth for camping on the virtual carrier which may therefore reduce complexity of performing the camp-on process, but there is no requirement to have the same bandwidth for the virtual carrier as for the centre band and, as explained above, a virtual carrier based on LTE can be of any size between 12 to 1188 sub-carriers. For example, in some systems, a virtual carrier having a bandwidth of less than 72 sub-carriers may be considered as a waste of the virtual carrier terminal's receiver resources, but from another point of view, it may be considered as reducing the impact of the virtual carrier on the host carrier by increasing the bandwidth available to conventional LTE terminals. The bandwidth of a virtual carrier can therefore be adjusted to achieve the desired balance between complexity, resource utilization, host carrier performance and requirements for virtual carrier terminals.

Uplink Transmission Frame

So far, the virtual carrier has been discussed primarily with reference to the downlink, however in some examples a virtual carrier can also be inserted in the uplink.

In frequency division duplex (FDD) networks both the uplink and downlink are active in all sub-frames, whereas in time division duplex (TDD) networks sub-frames can either be assigned to the uplink, to the downlink, or further sub-divided into uplink and downlink portions.

In order to initiate a connection to a network, conventional LTE terminals make a random access request on the physical random access channel (PRACH). The PRACH is located in predetermined blocks of resource elements in the uplink frame, the positions of which are signaled to the LTE terminals in the system information signaled on the downlink.

Additionally, when there is pending uplink data to be transmitted from an LTE terminal and the terminal does not already have any uplink resources allocated to it, it can transmit a random access request PRACH to the base station. A decision is then made at the base station as to which if any uplink resource is to be allocated to the terminal device that has made the request. Uplink resource allocations are then signaled to the LTE terminal on the physical downlink control channel (PDCCH) transmitted in the control region of the downlink sub-frame.

In LTE, transmissions from each terminal device are constrained to occupy a set of contiguous resource blocks in a frame. For the physical uplink shared channel (PUSCH) the uplink resource allocation grant received from the base station will indicate which set of resource blocks to use for that transmission, where these resource blocks could be located anywhere within the channel bandwidth.

The first resources used by the LTE physical uplink control channel (PUCCH) are located at both the upper and lower edge of the channel, where each PUCCH transmission occupies one resource block. In the first half of a sub-frame this resource block is located at one channel edge, and in the second half of a sub-frame this resource block is located at the opposite channel edge. As more PUCCH resources are required, additional resource blocks are assigned in a sequential manner, moving inward from the channel edges. Since PUCCH signals are code division multiplexed, an LTE uplink can accommodate multiple PUCCH transmissions in the same resource block.

Virtual Uplink Carrier

In accordance with embodiments of the present invention, the virtual carrier terminals described above can also be provided with a reduced capability transmitter for transmitting uplink data. The virtual carrier terminals are arranged to transmit data across a reduced bandwidth. The provision of a reduced capability transmitter unit provides corresponding advantages to those achieved by providing a reduced capability receiver unit with, for example, classes of devices that are manufactured with a reduced capability for use with, for example, MTC type applications.

Figure 13A:
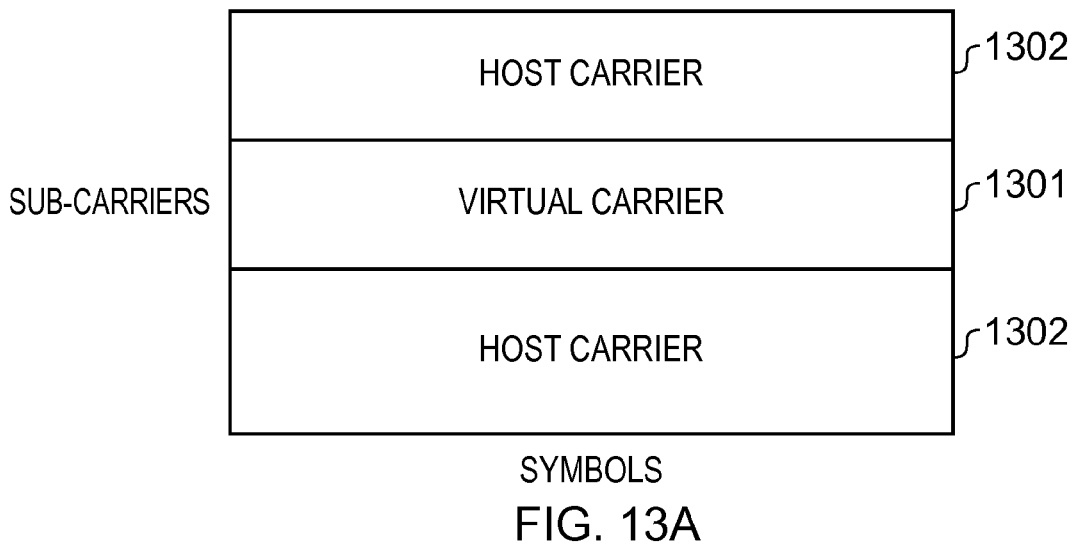
FIGS. 13A to 13C provide schematic diagrams illustrating LTE uplink sub-frames in which an uplink virtual carrier has been inserted in accordance with an embodiment of the present invention.

In correspondence with the downlink virtual carrier, the virtual carrier terminals transmit uplink data across a reduced range of sub-carriers within a host carrier that has a greater bandwidth than that of the reduced bandwidth virtual carrier. This is shown in FIG. 13A. As can be seen from FIG. 13A, a group of sub-carriers in an uplink sub-frame form a virtual carrier 1301 within a host carrier 1302.

Accordingly, the reduced bandwidth across which the virtual carrier terminals transmit uplink data can be considered a virtual uplink carrier.

In order to implement the virtual uplink carrier, the base station scheduler serving a virtual carrier ensures that all uplink resource elements granted to virtual carrier terminals are sub-carriers that fall within the reduced bandwidth range of the reduced capability transmitter units of the virtual carrier terminals. Correspondingly, the base station scheduler serving the host carrier typically ensures that all uplink resource elements granted to host carrier terminals are sub-carriers that fall outside the set of sub-carriers occupied by the virtual carrier terminals. However, if the schedulers for the virtual carrier and the host carrier are implemented jointly, or have means to share information, then the scheduler of the host carrier can assign resource elements from within the virtual carrier region to terminal devices on the host carrier during sub-frames when the virtual carrier scheduler indicates that some or all of the virtual carrier resources will not be used by terminal devices on the virtual carrier.

If a virtual carrier uplink incorporates a physical channel that follows a similar structure and method of operation to the LTE PUCCH, where resources for that physical channel are expected to be at the channel edges, for virtual carrier terminals these resources could be provided at the edges of the virtual carrier bandwidth and not at the edges of the host carrier. This is advantageous since it would ensure that virtual carrier uplink transmissions remain within the reduced virtual carrier bandwidth.

Virtual Uplink Carrier Random Access

In accordance with conventional LTE techniques, it cannot be guaranteed that the PRACH will be within the sub-carriers allocated to the virtual carrier. In some embodiments therefore, the base station provides a secondary PRACH within the virtual uplink carrier, the location of which can be signaled to the virtual carrier terminals via system information on the virtual carrier. This is shown for example in FIG. 13B in which a PRACH 1303 is located within the virtual carrier 1301. Thus, the virtual carrier terminals send PRACH requests on the virtual carrier PRACH within the virtual uplink carrier. The position of the PRACH can be signaled to the virtual carrier terminals in a virtual carrier downlink signaling channel, for example in system information on the virtual carrier.

Figure 13B:
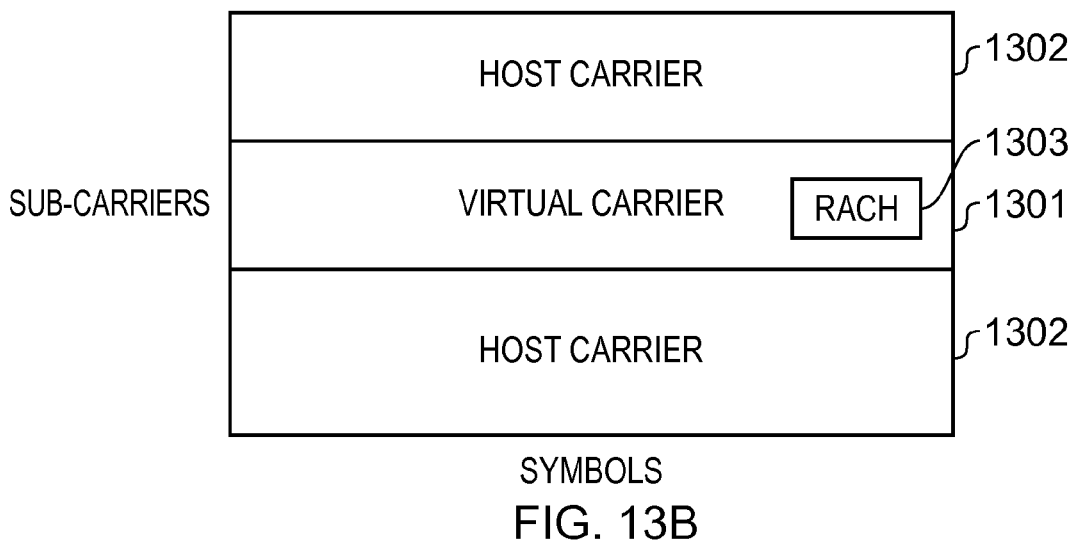
Figure 13C:
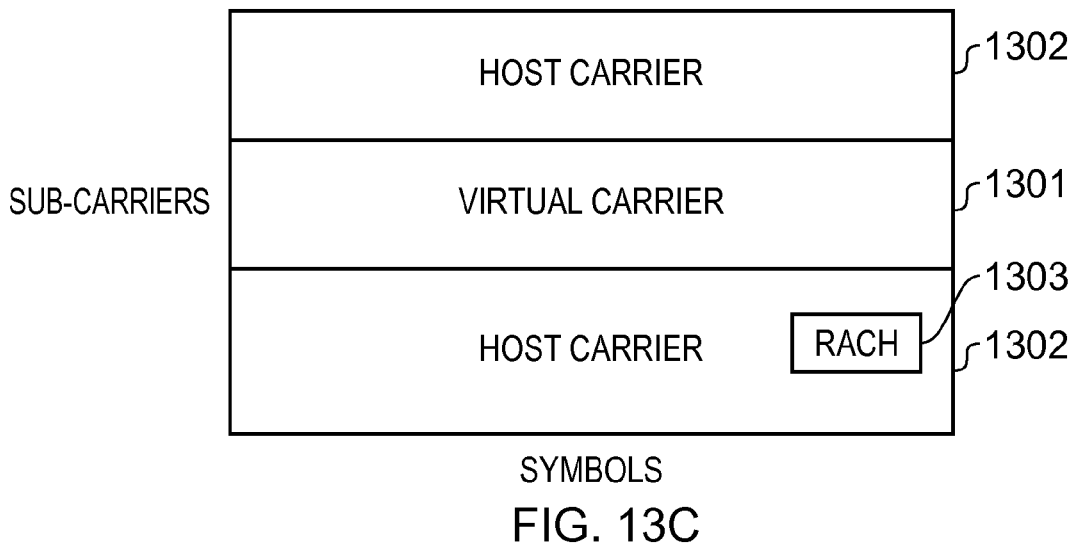

However, in other examples, the virtual carrier PRACH 1303 is situated outside of the virtual carrier as shown for example in FIG. 13C. This leaves more room within the virtual uplink carrier for the transmission of data by the virtual carrier terminals. The position of the virtual carrier PRACH is signaled to the virtual carrier terminals as before but in order to transmit a random access request, the virtual carrier terminals re-tune their transmitter units to the virtual carrier PRACH frequency because it is outside of the virtual carrier. The transmitter units are then re-tuned to the virtual carrier frequency when uplink resource elements have been allocated.

In some examples where the virtual carrier terminals are capable of transmitting on a PRACH outside of the virtual carrier, the position of the host carrier PRACH can be signaled to the virtual carrier terminals. The virtual carrier terminals can then simply use the conventional host carrier PRACH resource to send random access requests. This approach is advantageous as fewer PRACH resources have to be allocated.

However, if the base station is receiving random access requests from both conventional LTE terminals and virtual carrier terminals on the same PRACH resource, it is necessary that the base station is provided with a mechanism for distinguishing between random access requests from conventional LTE terminals and random access requests from virtual carrier terminals.

Therefore, in some examples a time division allocation is implemented at the base station whereby, for example, over a first set of sub-frames the PRACH allocation is available to the virtual carrier terminals and over a second set of sub-frames the PRACH allocation is available to conventional LTE terminals. Accordingly, the base station can determine that random access requests received during the first set of sub-frames originate from virtual carrier terminals and random access requests received during the second set of sub-frames originate from conventional LTE terminals.

In other examples, no mechanism is provided to prevent both virtual carrier terminals and conventional LTE terminals transmitting random access requests at the same time. However, the random access preambles that are conventionally used to transmit a random access request are divided into two groups. The first group is used exclusively by virtual carrier terminals and the second group is used exclusively by conventional LTE terminals. Accordingly, the base station can determine whether a random access request originated from a conventional LTE terminal or a virtual carrier terminal simply by ascertaining to what group the random access preamble belongs.

Example Architecture

Figure 14:
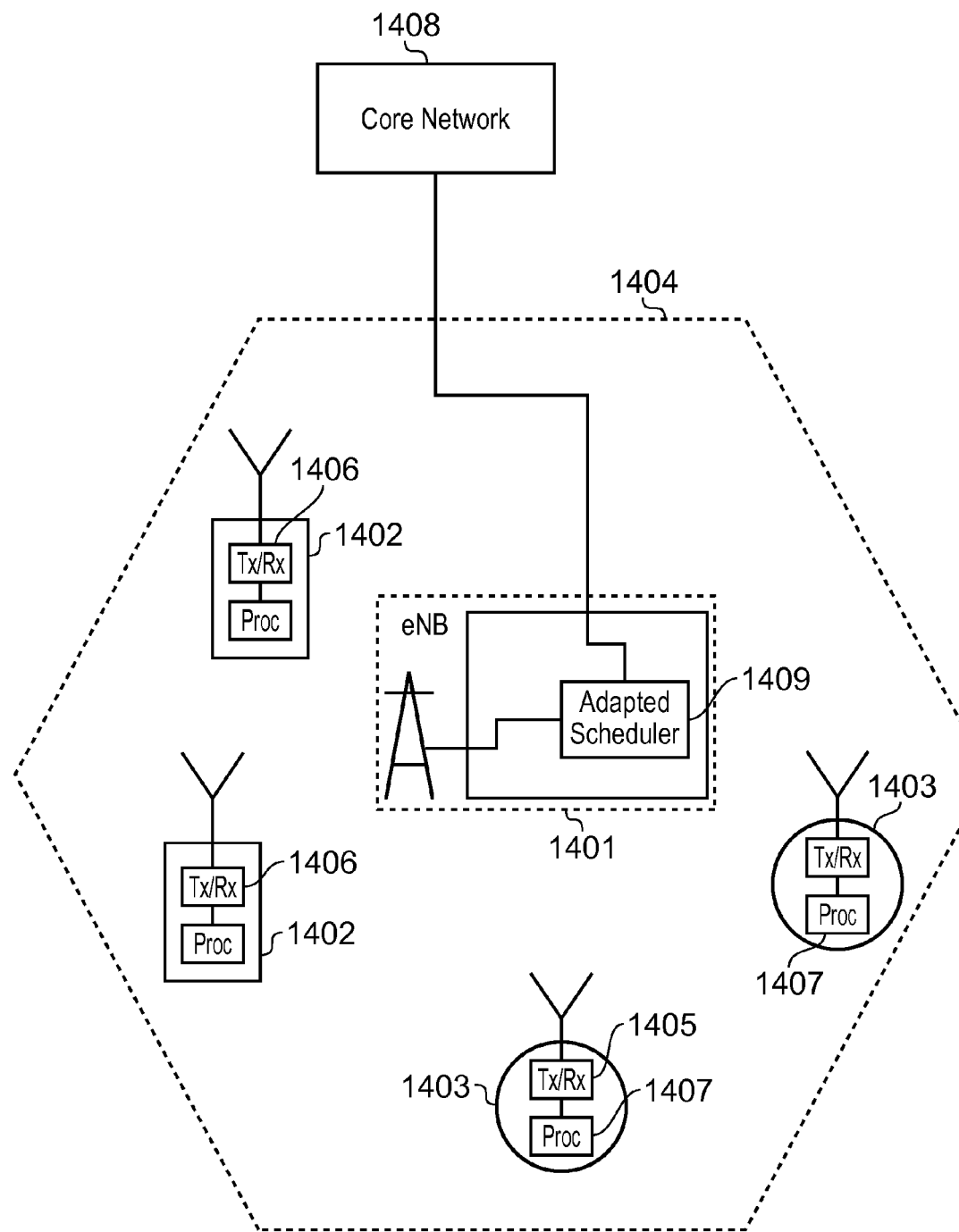
FIG. 14 provides a schematic diagram showing part of an adapted LTE mobile telecommunication network arranged in accordance with an example of the present invention.

FIG. 14 provides a schematic diagram showing part of an adapted LTE mobile telecommunication system arranged in accordance with an example of the present invention. The system includes an adapted enhanced Node B (eNB) 1401 connected to a core network 1408 which communicates data to a plurality of conventional LTE terminals 1402 and reduced capability terminals 1403 within a coverage area (cell) 1404. Each of the reduced capability terminals 1403 has a transceiver unit 1405 which includes a receiver unit capable of receiving data across a reduced bandwidth and a transmitter unit capable of transmitting data across a reduced bandwidth when compared with the capabilities of the transceiver units 1406 included in the conventional LTE terminals 1402.

The adapted eNB 1401 is arranged to transmit downlink data using a sub-frame structure that includes a virtual carrier as described with reference to FIG. 5 and to receive uplink data using a sub-frame structure as described with reference to FIG. 13B or 13C. The reduced capability terminals 1403 are thus able to receive and transmit data using the uplink and downlink virtual carriers as described above.

As has been explained above, because the reduced complexity terminals 1403 receive and transmit data across a reduced bandwidth on the uplink and downlink virtual carriers, the complexity, power consumption and cost of the transceiver unit 1405 needed to receive and decode downlink data and to encode and transmit uplink data is reduced compared to the transceiver unit 1406 provided in the conventional LTE terminals.

When receiving downlink data from the core network 1408 to be transmitted to one of the terminals within the cell 1404, the adapted eNB 1401 is arranged to determine if the data is bound for a conventional LTE terminal 1402 or a reduced capability terminal 1403. This can be achieved using any suitable technique. For example, data bound for a reduced capability terminal 1403 may include a virtual carrier flag indicating that the data must be transmitted on the downlink virtual carrier. If the adapted eNB 1401 detects that downlink data is to be transmitted to a reduced capability terminal 1403, an adapted scheduling unit 1409 included in the adapted eNB 1401 ensures that the downlink data is transmitted to the reduced capability terminal in question on the downlink virtual. In another example the network is arranged so that the virtual carrier is logically independent of the eNB. More particularly the virtual carrier may be arranged to appear to the core network as a distinct cell so that it is not known to the core network that the virtual carrier has any relationship with the host carrier. Packets are simply routed to/from the virtual carrier just as they would be for a conventional cell.

In another example, packet inspection is performed at a suitable point within the network to route traffic to or from the appropriate carrier (i.e. the host carrier or the virtual carrier).

In yet another example, data from the core network to the eNB is communicated on a specific logical connection for a specific terminal device. The eNB is provided with information indicating which logical connection is associated with which terminal device. Information is also provided at the eNB indicating which terminal devices are virtual carrier terminals and which are conventional LTE terminals. This information could be derived from the fact that a virtual carrier terminal would initially have connected using virtual carrier resources. In other examples virtual carrier terminals are arranged to indicate their capability to the eNB during the connection procedure. Accordingly the eNB can map data from the core network to a specific terminal device based on whether the terminal device is a virtual carrier terminal or an LTE terminal.

When scheduling resources for the transmission of uplink data, the adapted eNB 1401 is arranged to determine if the terminal to be scheduled resources is a reduced capability terminal 1403 or a conventional LTE terminal 1402. In some examples this is achieved by analysing the random access request transmitted on the PRACH using the techniques to distinguish between a virtual carrier random access request and a conventional random access request as described above. In any case, when it has been determined at the adapted eNB 1401 that a random access request has been made by a reduced capability terminal 1402, the adapted scheduler 1409 is arranged to ensure that any grants of uplink resource elements are within the virtual uplink carrier.

In some examples, the virtual carrier inserted within the host carrier can be used to provide a logically distinct "network within a network". In other words data being transmitted via the virtual carrier can be treated as logically and physically distinct from the data transmitted by the host carrier network. The virtual carrier can therefore be used to implement a so-called dedicated messaging network (DMN) which is "laid over" a conventional network and used to communicate messaging data to DMN devices (i.e. virtual carrier terminals).

Further Example Applications of Virtual Carriers

Having set out the concepts of virtual carriers of the kind described in co-pending UK patent applications numbered GB 1101970.0 [2], GB 1101981.7 [3], GB 1101966.8 [4], GB 1101983.3 [5], GB 1101853.8 [6], GB 1101982.5 [7], GB 1101980.9 [8] and GB 1101972.6 [9], some extensions of the virtual carrier concept in accordance with embodiments of the invention are now described.

Figure 15A:
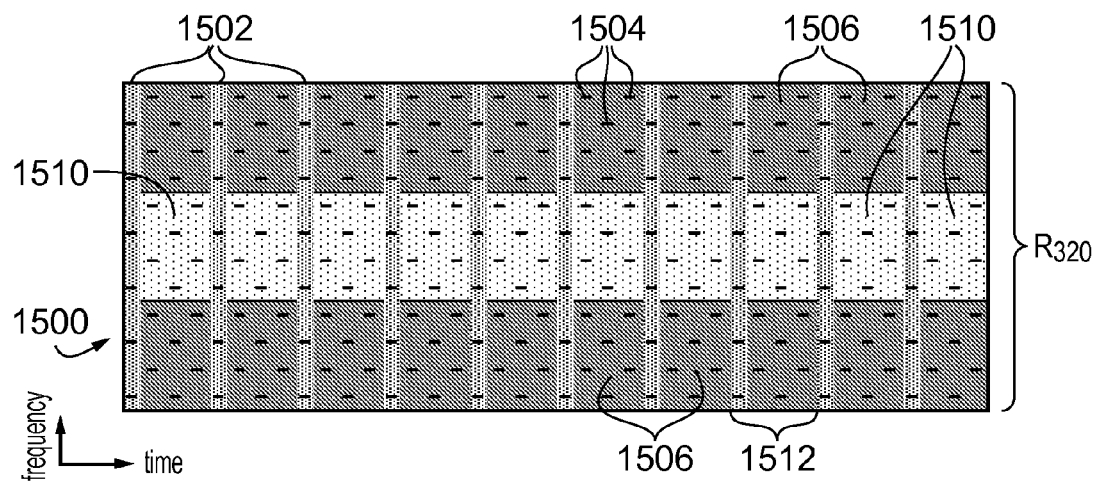
FIG. 15A schematically represents an example allocation of transmission resources between a host and virtual carrier in a LTE mobile telecommunication network arranged according to an embodiment of the invention.

FIG. 15A is a schematic diagram representing how various regions in a LTE-type telecommunications network's time-frequency transmission resource grid 1500 might be allocated for use to support a virtual carrier such as described above. The extent of the resource grid 1500 shown in FIG. 15A comprises 10 sub-frames 1512 (equivalent to one frame overall) spaced along the horizontal time direction and spans a bandwidth $R_{320}$ in frequency. Each sub-frame 1512 in FIG. 15A follows the same general format as the sub-frame in FIG. 5 but is represented in a more simplified and schematic manner.

Thus, the transmission resource grid 1500 of FIG. 15A comprises host carrier PDCCH regions 1502, host carrier PDSCH regions 1506, virtual carrier regions 1510 and reference symbol regions 1504. The virtual carrier regions 1510 may comprise separate virtual carrier PDSCH regions and virtual carrier PDCCH regions, such as schematically shown in FIG. 5 by the separate regions identified by reference numerals 501 and 502. However, and as noted above, in other example implementations the principles of the virtual carrier operation might not mirror these aspects of LTE-type networks. The reference symbol regions 1504 may be used solely for the host carrier, or these regions may also be received and used by terminals camped-on to the virtual carrier.

Figure 15B:
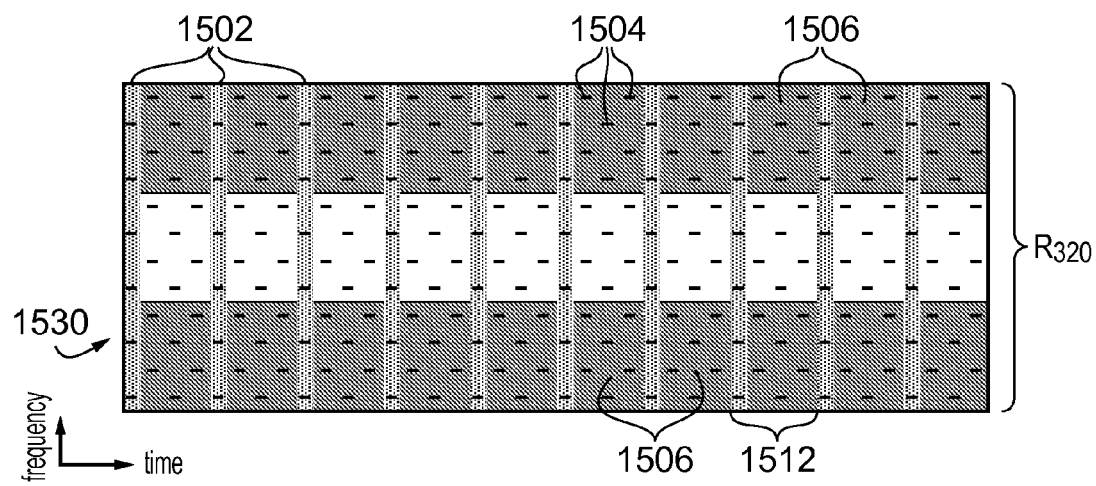
FIG. 15B schematically represents an example allocation of transmission resources for a host carrier in a LTE mobile telecommunication network arranged according to an embodiment of the invention.

FIG. 15B is similar to and will be understood from FIG. 15A, but whereas FIG. 15A schematically represents regions of the time-frequency transmission resource grid 1500 for both the host and virtual carriers, FIG. 15B schematically represents only regions associated with the host carrier (i.e. the host carrier PDCCH regions 1502, host carrier PDSCH regions 1506 and reference symbol regions 1504). In effect FIG. 15B represents what might be referred to as the host-carrier transmission resource grid 1530. The regions of FIG. 15B shown without shading are associated with the virtual carrier and do not "belong" to the host-carrier transmission resource grid 1530.

Figure 15C:
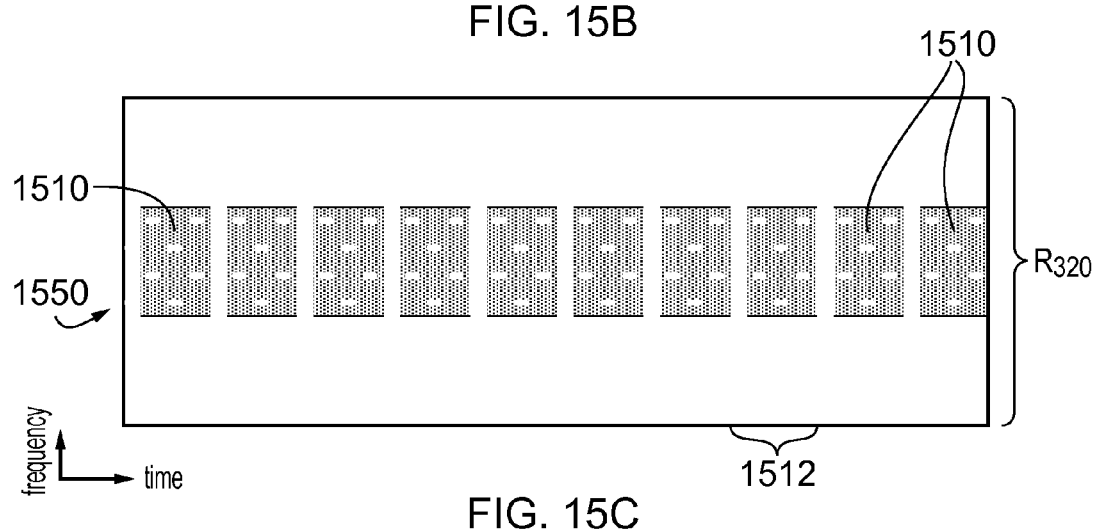
FIG. 15C schematically represents an example allocation of transmission resources for a virtual carrier in a LTE mobile telecommunication network arranged according to an embodiment of the invention.

FIG. 15C is also similar to and will be understood from FIG. 15A, but whereas FIG. 15A schematically represents regions of the time-frequency transmission resource grid 1500 for both the virtual and host carriers, FIG. 15C schematically represents only regions associated with the virtual carrier (i.e. the virtual carrier regions 1510). FIG. 15C is thus the counter-part to FIG. 15B. In effect FIG. 15C represents what might be referred to as the virtual-carrier transmission resource grid 1550. The regions of FIG. 15C shown without shading are associated with the host carrier and do not "belong" to the virtual-carrier transmission resource grid 1550.

The host-carrier transmission resource grid 1530 and virtual-carrier transmission resource grid 1550 complement one another in that one "fills" the spaces in the other so that when added together they correspond to the overall transmission resource grid 1510 of FIG. 15A. Thus to summarise some embodiments of the invention, communications are supported using a plurality of Orthogonal Frequency Division Multiplex, OFDM, sub-carriers spanning a first frequency bandwidth (e.g. $R_{320}$ in FIGS. 15A to 15C). User-plane data may be communicated on the host carrier using a first group of the OFDM sub-carriers distributed across the first frequency bandwidth (e.g. in regions 1506 of FIG. 15B) and user-plane data may be communicated on the virtual carrier using a second group of the OFDM sub-carriers distributed across a second frequency bandwidth, wherein the second frequency bandwidth is smaller than and within the first frequency bandwidth (e.g. within regions 1510 of FIG. 15C). However, control-plane data for the host carrier (e.g. PDCCH) may be communicated using both groups of the OFDM sub-carriers (e.g. in regions 1502 of FIG. 15B).

Figure 16:
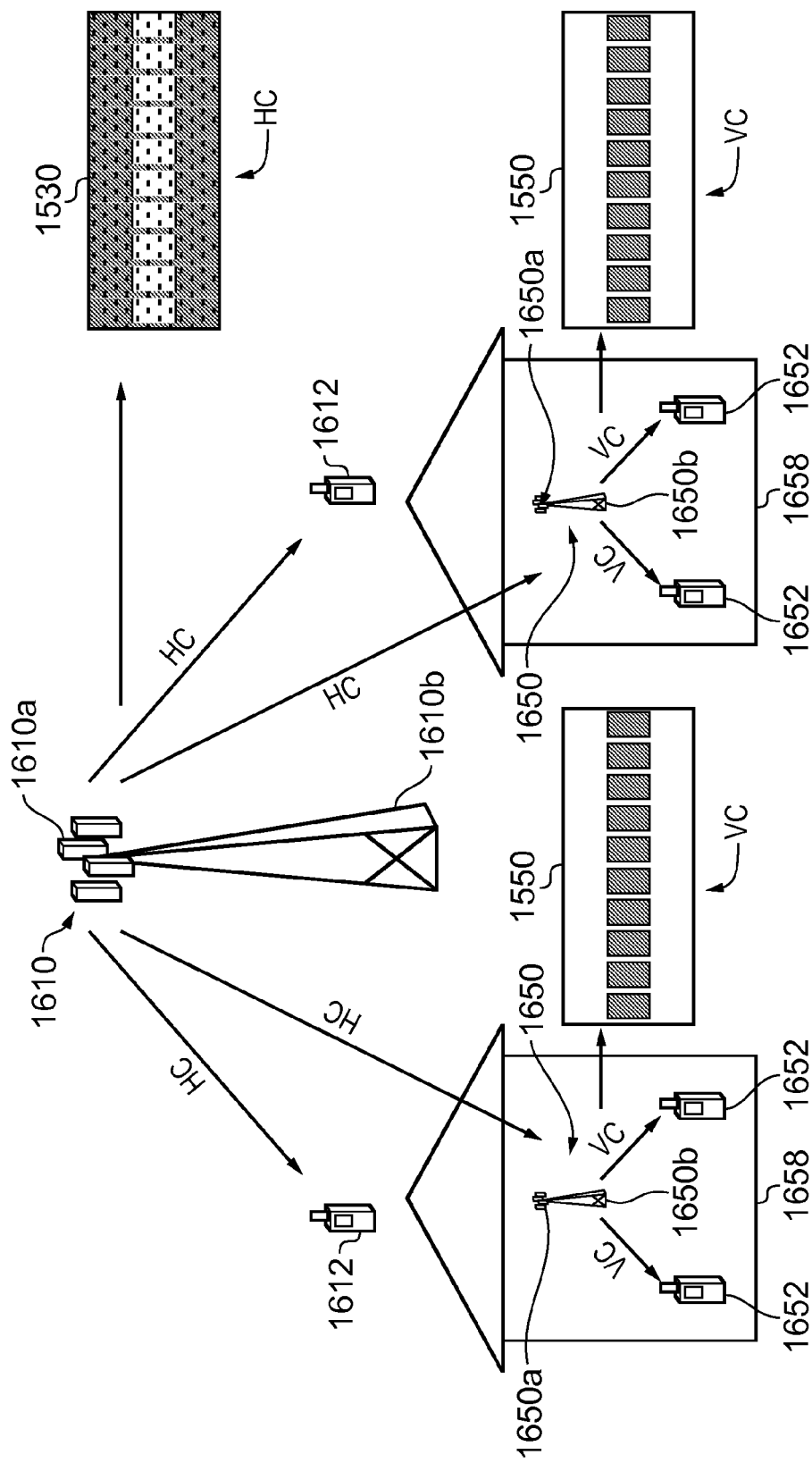
FIG. 16 schematically shows a mobile telecommunication network architecture according to an embodiment of the invention.

FIG. 16 schematically represents an architecture for a generally LTE-based telecommunications system 1600 arranged in accordance with an embodiment of the invention. The system 1600 comprises an e-NodeB (base station) 1610 arranged to communicate with a plurality of terminal devices 1612 and a plurality of home eNode-Bs (home base stations) 1650 in a serving cell of the base station/e-NodeB 1610. The home base stations 1650 are in turn arranged to communicate with respective terminal devices 1652 within their own serving cells 1658 (these serving cells being schematically represented as houses in FIG. 16). As is conventional, each of the base stations 1610, 1650 may comprise a transceiver unit 1610a, 1650a for transmission and reception of wireless signals, and a controller unit 1610b, 1650b configured to control the respective base stations 1610, 1650 to operate as desired according to the principles described herein. For example, the respective controller units may comprise respective processor units which are suitably configured/programmed to provide the desired functionality using conventional programming/configuration techniques for base stations in wireless telecommunications systems Many aspects of the general configuration represented in FIG. 16 follow the known principles of so-called micro-, femto- or pico-cells in wireless telecommunications systems. In accordance with these schemes, a "master" base station (base station 1610 in the example of FIG. 16) supports communications with conventional terminal devices within its cell range (such as terminal devices 1612 in FIG. 16). In addition, one or more localised wireless telecommunication cells are supported by local base stations located within the cell footprint of the master base station. These localised wireless telecommunication cells are often referred to as micro-, femto- or pico-cells depending on the size of the operating cell. They may also be referred to as "home" cells, reflecting an intended use as a hub for in-home wireless communications. For the sake of convenience the "local" base stations 1650 in this example will generally be referred to as femto base stations (femto e-NodeBs). However, it will be appreciated this is purely for the sake of convenience in terminology for distinguishing the different types of base station, and it is not to be interpreted as restricting embodiments of the invention to any particular geographic cell size associated with the "local" base stations 1650 of FIG. 16.

As well as the femto base stations 1650 supporting wireless communication with terminal devices 1652 within their respective ranges, the femto base stations 1650 may also communicate with the master base station 1610. The respective femto base stations 1650 may communicate wirelessly with the master base station 1600 and/or they may communicate over a wired link, for example via a conventional internet connection, such as may be provided by a DSL connection in the vicinity of the respective femto base stations 1650. Thus the femto base station(s) may in effect provide a gateway/relay role for attached terminal devices 1652 to communicate with the master base station 1650 and beyond (e.g. to the internet) via their associated femto base station 1650, or to communicate directly with the internet without involving the master base station 1610.

The present inventors have recognized that a configuration of the kind shown in FIG. 16 involving terminal devices 1652 connected to a local femto base station can be one in which there will be a desire to support terminal devices having the characteristics of a machine type communication (MTC) device of the kind described above. Furthermore, in these circumstances there will often be a desire to allow for the MTC devices 1652 having relatively low capabilities (e.g. reduced operating bandwidth) to be supported. By way of a concrete example, the extent of a femto-cell 1658 such as shown in FIG. 16 might correspond to an individual's home, and terminal devices 1652 within the user's home might comprise, for example, a television receiver, a media player and a games console. These device may be configured wirelessly with one another and with devices outside the home via the femto base station 1650.

The present inventors have recognized the virtual carrier concept described above could be implemented in the circumstances represented in FIG. 16 by the master base station 1610 supporting communications using resources associated the host carrier (HC) and the femto base stations 1650 supporting communications using resources associated the virtual carrier(s) (VC). This approach is schematically represented in FIG. 16 by the depiction of the host-carrier transmission resource grid 1530 of FIG. 15B adjacent the "master" base station 1610 and the depiction of the virtual-carrier transmission resource grid 1550 of FIG. 15C adjacent respective ones of the femto base stations 1650.

Transmission powers associated with the different femto base stations 1650 and their associated terminal devices 1652 could be set at levels that results in little interference between signalling associated with the different femto base stations 1650. This would allow the same virtual carrier resources (e.g. such as those shown in FIG. 15C) to be used for communications associated with different femto base stations 1650. For example, if the characteristic femto cell size is on the order of tens of meters, and neighbouring femto cells are a comparable distance apart, transmission powers that decay to non-reliable detection over a corresponding characteristic distance could be used. This approach can be transmission resource efficient because resources associated with the virtual carrier can be re-used within different femto cells within the overall footprint of the same master base station.

Thus, a mode of operating a telecommunications network in accordance with an embodiment of the invention is one in which a virtual carrier and a host carrier are supported by different cell sites. A master (or "host") base station can support communications with terminal devices which are out of range of the femto base stations, and in some examples also communications with the femto base stations themselves, using non-virtual carrier resources. Transmissions from the host base station may maintain PDCCH and Reference Signal transmission on frequencies that overlap with the virtual carrier to preserve backward compatibility in the manner described above. The femto base station(s), on the other hand, use the virtual carrier resources to service device, such as MTC devices, that are within the corresponding femto cell(s). By following this approach, the telecommunications system can support an increased number of low capability terminal devices on the virtual carrier by resource re-use at different geographic locations, while maintaining backward compatibility with what might be termed legacy devices operating according to an existing telecommunications standard.

In the example virtual carrier implementation described above with reference to FIGS. 15A to 15C and FIG. 16, reference symbols 1504 associated with the host carrier are maintained across the full operating bandwidth of the host carrier. This results in "holes" in the virtual carrier transmission resource grid 1550 of FIG. 15C. In another example, the host carrier may be configured to not use some of these reference symbols to increase the available resources/reduce disruption on the virtual carrier. For example, the host carrier may be configured to not use reference symbols on OFDM sub-carriers that are within the group of OFDM sub-carriers comprising the bandwidth of the virtual carrier and outside the host-carrier PDCCH. This approach is schematically represented in FIG. 17A.

Figure 17A:
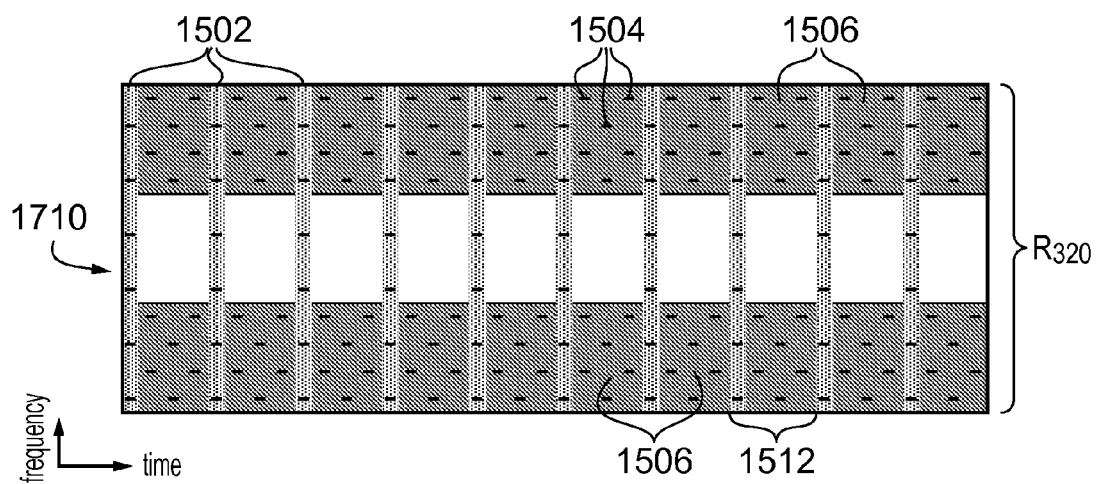
FIGS. 17A and 17B schematically represents two example allocations of transmission resources for a host carrier in a LTE mobile telecommunication network arranged according to an embodiment of the invention.

FIG. 17A schematically shows a host-carrier transmission resource grid 1710 which is similar to and will be understood from the host-carrier transmission resource grid 1530 of FIG. 15B, with corresponding elements being identified by corresponding reference numerals. However, the host-carrier transmission resource grid 1710 of FIG. 17A differs from the host-carrier transmission resource grid 1530 of FIG. 15B in the arrangement of reference symbols 1504. In particular, in the host-carrier transmission resource grid 1710 of FIG. 17A there are no host-carrier reference symbols transmitted on the OFDM sub-carriers making up the virtual carrier on symbols which are outside the host-carrier PDCCH. That is to say, there are no "holes" in the virtual carrier resources in each sub-frame (i.e. in the parts without shading in FIG. 17A) which are associated with reference symbols 1504 for the host carrier.

With the host transmission resource grid represented in FIG. 17A, a conventional LTE-compliant terminal device (a "legacy" device) camped-on to the host carrier will find that a number of the expected reference symbols are not received. In accordance with the defined LTE standards, a legacy device will in these circumstances assume it has for some reason missed the reception of these reference signals, and will interpolate channel conditions over the virtual carrier frequencies from the reference signals it has received, i.e. those transmitted outside the virtual carrier bandwidth in FIG. 17A. (The arrangement of reference symbol within the OFDM symbols associated with the host's PDCCH 1502 remains unaffected in this example.) The need for the legacy terminal to interpolate channel conditions across the virtual channel frequencies will to some extent degrade a legacy device's channel estimations for the virtual carrier frequencies. However, a legacy device camped-on to the host carrier will not generally be serviced in the virtual carrier frequency band (apart from in respect of PDCCH for which host reference symbols are maintained in this example). Accordingly, the impact of the legacy devices interpolating channel conditions for these regions of the spectrum may be minimal.

Figure 17B:
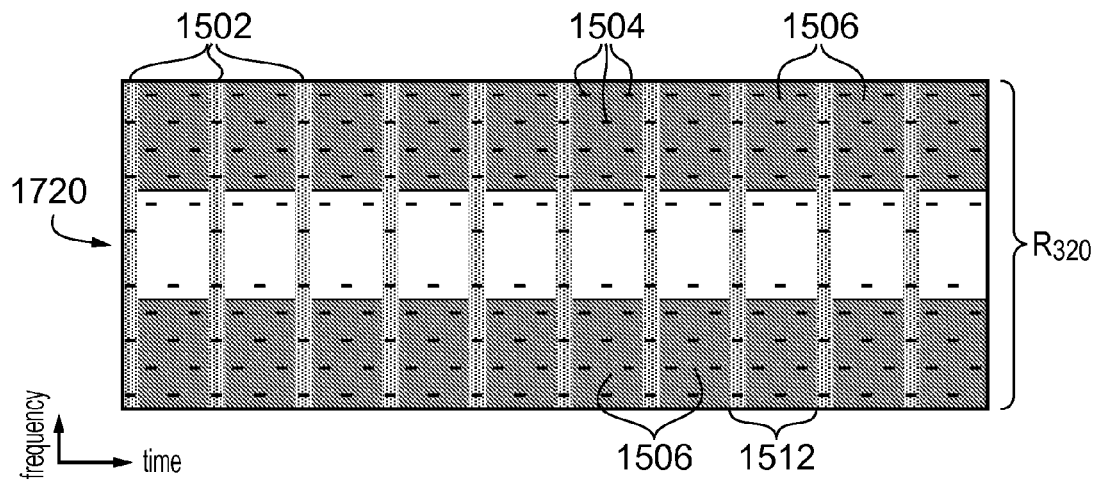

FIG. 17B schematically shows a host-carrier transmission resource grid 1720 which is similar to and will be understood from the host-carrier transmission resource grids 1530, 1710 of FIGS. 15B and 17A, with corresponding elements being identified by corresponding reference numerals. However, the host-carrier transmission resource grid 1720 of FIG. 17B differs from the host-carrier transmission resource grids 1530, 1710 of FIGS. 15B and 17A in the arrangement of reference symbols 1504. In particular, the host-carrier transmission resource grid 1720 of FIG. 17B represents a compromise between that of FIG. 15B (with full use of host reference symbols within virtual carrier resources) and that of FIG. 17A (with no use of host reference symbols within virtual carrier resources). Thus in the example of FIG. 17B there is a reduced density of host-carrier reference symbols transmitted on the OFDM sub-carriers making up the virtual carrier on symbols which are outside the host-carrier PDCCH as compared to elsewhere in the sub-frame. That is to say, there are fewer "holes" in the virtual carrier resources (i.e. in the parts without shading in FIG. 17B) associated with reference symbols 1504 for the host carrier as compared to FIG. 15B, but more holes as compared with FIG. 17A. This provides for a balance between improved channel estimation on the host carrier and reduced disruption of the virtual carrier by host-carrier reference symbols. In the example shown in FIG. 17B the host carrier reference symbols that are transmitted at the times and frequencies which are primarily reserved for the virtual carrier are transmitted near to the boundary between the virtual carrier and host carrier. This can help reduce interpolation effects in the host carrier region.

A consideration for some example implementations in which a host carrier and a virtual carrier are transmitted from different cell sites is time and frequency matching between the master base station and respective femto base stations. It is expected for optimum operation that the virtual carrier resources associated with the femto base station should map closely to the corresponding "gaps" in the host carrier resources associated with the master base station, and vice versa. That is to say, improved operation may be achieved if the schematic grids in FIGS. 15B and 15C add together to form the grid represented in FIG. 15A with appropriate registration and without undue offset. This will help minimise interference between the host and virtual carriers.

In terms of temporal synchronisation (i.e. corresponding left-right alignment between FIGS. 15B and 15C) the femto base station(s) can simply rely on conventional synchronisation signalling from the master base station transmitted on the host carrier (e.g. PSS and SSS) to in effect lock the femto base station(s) clock to the master base station clock.

In terms of frequency synchronisation/matching (i.e. corresponding to up-down alignment between FIGS. 15B and 15C) it would be possible to match frequencies to an appropriate degree with any conventional techniques for mutual-locking of separated oscillators, or by simply using sufficiently high quality frequency standards at each geographic location. However, another approach would be to introduce guard regions at the frequency interface(s) between OFDM sub-carriers associated with the host carrier and OFDM sub-carriers associated with the virtual carrier in the relevant symbols (i.e. the symbols during which both carriers are potentially active). This approach is schematically represented in FIG. 18.

Figure 18:
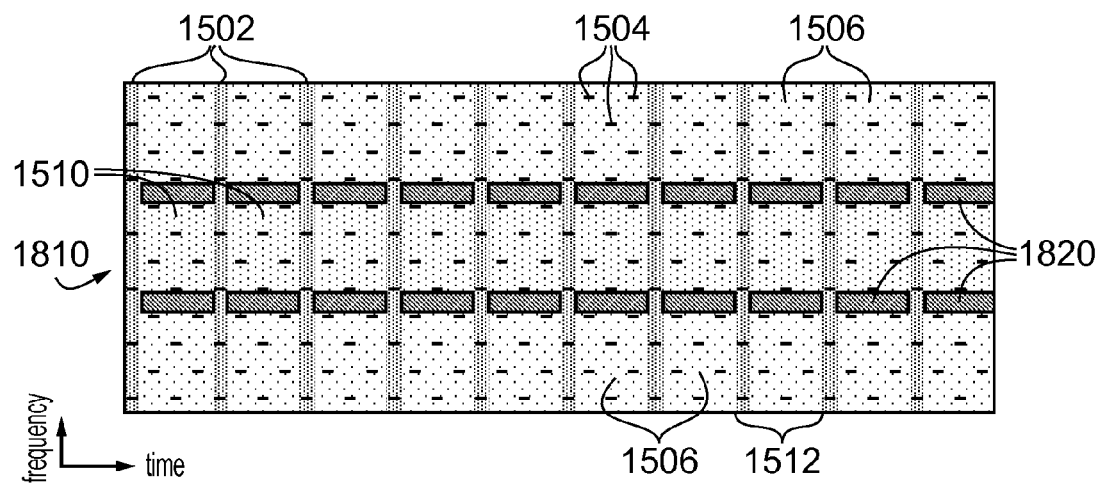
FIG. 18 schematically represents an example allocation of transmission resources between a host and virtual carrier in a LTE mobile telecommunication network arranged according to an embodiment of the invention.

FIG. 18 schematically shows a transmission resource grid 1810 which is similar to and will be understood from the transmission resource grid 1510 of FIG. 15A, with corresponding elements being identified by corresponding reference numerals. As with FIG. 15A, FIG. 18 schematically shows host carrier PDCCH regions 1502, host carrier PDSCH regions 1506, virtual carrier regions 1510 and reference symbol regions 1504. However, the transmission resource grid 1810 of FIG. 18 differs from that of FIG. 15A by the inclusion of guard regions 1820 (shown cross hatched in the figure).

The guard regions in this example comprise a group of OFDM sub-carriers located between (in frequency space) the host carrier PDSCH regions 1506 and the virtual carrier regions 1510 during symbols when the virtual carrier is being used. The guard regions do not extend into the regions corresponding to PDCCH 1502 on the host carrier. This is to help maximise compatibility with legacy terminal devices using the host carrier (there should be no risk of interference from frequency differences in this region in this example implementation because the virtual carrier is not allocated for use at these times).

In accordance with some example embodiments of the invention neither the master base station nor the femto base station(s) allocate transmission resources within the guard regions for use. Thus if the virtual carrier resource grid drifts in frequency relative to the host carrier resource grid, and the magnitude of the drift is within the frequency extent of the guard regions, there should be no significant increase in interference between the two carriers. Thus the extent of the guard regions in frequency may be chosen in dependence on the expected frequency drifts that might arise between the master base station and femto base station(s). If small frequency drifts are expected, correspondingly small guard regions may be used, for example spanning only a single or small number of OFDM sub-carriers. If larger frequency drifts are expected, correspondingly larger guard regions may be defined to help reduce the potential impact of overlapping transmissions.

In cases where reference symbols associated with the host carrier are maintained on OFDM sub-carriers within the operating frequency extent of the virtual carrier, such as schematically shown in FIGS. 15A, 17B and 18, it may also be helpful to include guard regions which are adjacent to (in terms of frequency) the reference symbols in the virtual carrier bandwidth. This approach is schematically represented in FIG. 19.

Figure 19:
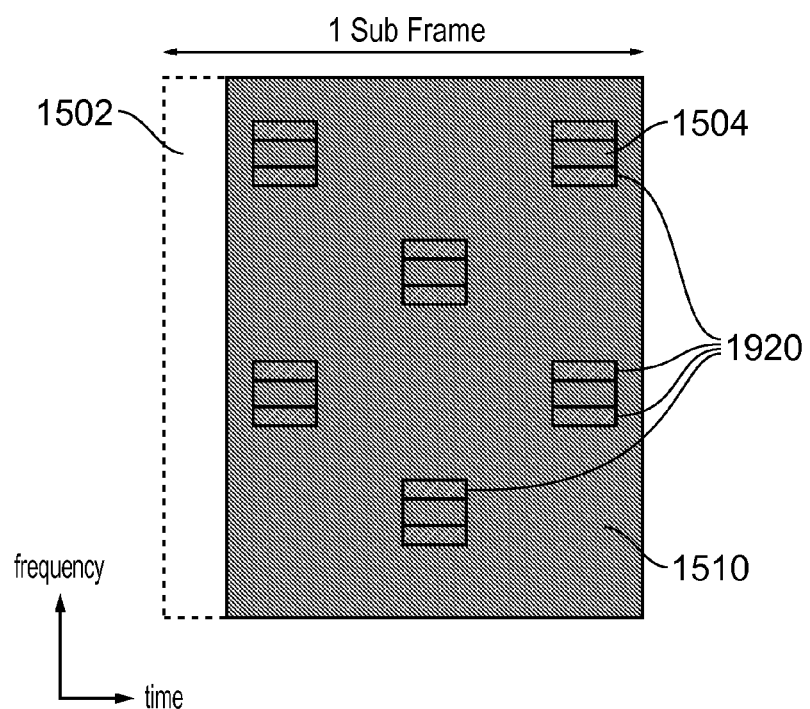
FIG. 19 schematically represents an example allocation of transmission resources for a virtual carrier in a LTE mobile telecommunication network arranged according to an embodiment of the invention.

FIG. 19 schematically shows a portion of a transmission resource grid which is similar to and will be understood from (a portion of) the transmission resource grid 1510 of FIG. 15A, with corresponding elements being identified by corresponding reference numerals. The portion of the grid shown in FIG. 19 corresponds to the bandwidth of the virtual carrier for one sub-frame. Thus FIG. 18 schematically shows a portion of the host carrier PDCCH region 1502, a virtual carrier region 1510, and reference symbols 1504 associated with the host carrier. However, the portion of transmission resource grid of FIG. 18 differs from corresponding portions of the transmission resource grid 1510 of FIG. 15A by the inclusion of reference symbol guard regions 1920 (shown cross hatched in the figure). These may, for example, be provided in addition to the carrier-interface guard regions 1820 shown in FIG. 18.

The reference-symbol guard regions 1920 in this example comprise a group of OFDM sub-carriers located adjacent to (in frequency space) host carrier reference symbols occurring within the virtual carrier region 1510 during OFDM symbols when these reference symbols are being transmitted. In this example the reference-symbol guard regions 1920 are provided on both the upper and lower frequency sides of each reference symbol 1504.

In accordance with some example embodiments of the invention neither the master base station nor the femto base station(s) allocate transmission resources within the reference symbol guard regions for use. Thus, if the virtual carrier resource grid drifts in frequency relative to the host carrier resource grid, and the magnitude of the drift is within the frequency extent of the reference symbol guard regions, there should be no significant increase in interference between the host carrier reference symbols and transmissions on the virtual carrier(s).

While in some examples the different guard regions 1820, 1920 may not be used at all for data transmissions, in other examples these regions may be used by one or both of the master and femto base stations to transmit data with high error resistance (e.g. low rates), so that even if there is increased interference due to non-ideal frequency registration between the host and virtual carriers, some data transmitted in the guard regions can nonetheless be decoded with a reasonable chance of success.

It will be appreciated that various modifications can be made to the embodiments described above without departing from the scope of the present invention as defined in the appended claims. In particular although embodiments of the invention have been described with reference to an LTE mobile radio network, it will be appreciated that the present invention can be applied to other forms of network such as GSM, 3G/UMTS, CDMA2000, etc. The term MTC terminal as used herein can be replaced with user equipment (UE), mobile communications device, terminal device etc. Furthermore, although the term base station has been used interchangeably with e-nodeB it should be understood that there is no difference in functionality between these network entities.

It will also be appreciated that although the above description of a scheme in which host carriers and virtual carriers are supported by geographically separated base stations has primarily focussed on downlink transmissions by way of example, the same concepts can equally be applied for uplink transmissions.

Thus, there has been described a method and apparatus for communicating data in a wireless telecommunications system between a plurality of base stations and a plurality of terminal devices using a plurality of Orthogonal Frequency Division Multiplex, OFDM, sub-carriers spanning a first frequency bandwidth. The method comprises communicating data between a first base station and a first terminal device using a first group of the OFDM sub-carriers distributed across the first frequency bandwidth, communicating data between a second base station, which is geographically separated from the first base station, and a second terminal device using a second group of the OFDM sub-carriers distributed across a second frequency bandwidth and not using the first group of sub-carriers, wherein the second frequency bandwidth is smaller than and within the first frequency bandwidth, and the first and second groups are mutually exclusive; and communicating control-plane data between the first base station and the first terminal device using a combination of the first and second groups of the OFDM sub-carriers. Guard regions may be provided in the frequency domain between frequencies of transmissions associated with the first base station and frequencies of transmissions associated with the second base station. This can help reduce unintended overlaps in transmissions from the two base stations if there is a frequency mismatch between them.

Further particular and preferred aspects of the present invention are set out in the accompanying independent and dependent claims. It will be appreciated that features of the dependent claims may be combined with features of the independent claims in combinations other than those explicitly set out in the claims.

The invention claimed is:

1. A method of communicating data in a wireless telecommunications system between a plurality of base stations and a plurality of terminal devices using a plurality of Orthogonal Frequency Division Multiplex, OFDM, sub-carriers spanning a first frequency bandwidth, the method comprising:

communicating user-plane data between a first base station and a first terminal device using a first group of the OFDM sub-carriers distributed across the first frequency bandwidth;

communicating user-plane data between a second base station and a second terminal device using a second group of the OFDM sub-carriers distributed across a second frequency bandwidth, wherein the second frequency bandwidth is smaller than and within the first frequency bandwidth; and communicating control-plane data between the first base station and the first terminal device using a combination of the first and second groups of the OFDM sub-carriers.

2. The method of claim 1, wherein the second base station is a relay base station for the first base station, and the method further comprises communicating relay data between the first base station and the second base station using the first group of the OFDM sub-carriers.

3. The method of claim 2, wherein a lower amount of user-plane data is communicated using OFDM sub-carriers arranged in frequency at a boundary between OFDM sub-carriers in the first group and OFDM sub-carriers in the second group as compared to an amount of user-plane data communicated using OFDM sub-carriers away from this boundary.

4. The method of claim 3, wherein user-plane data is communicated at a reduced rate using OFDM sub-carriers at the boundary.

5. The method of claim 3, wherein no user-plane data is communicated using OFDM sub-carriers at the boundary.

6. The method of claim 1, further comprising transmitting reference signals from the first base station using both the first and second groups of the OFDM sub-carriers.

7. The method of claim 6, wherein a density of the reference signals in the time and/or frequency domain transmitted from the first base station using the first group of the OFDM sub-carriers is greater than a density of reference signals in the time and/or frequency domain transmitted from the first base station using the second group of the OFDM sub-carriers.

8. The method of claim 6, wherein a lower amount of user-plane data is communicated using at least one OFDM sub-carrier which is adjacent in frequency to an OFDM sub-carrier on which a reference signal is transmitted in the second group of the OFDM sub-carriers as compared to the amount of user-plane data communicated using an OFDM sub-carrier in the second group that is not adjacent in frequency to the reference signal.

9. The method of claim 8, wherein user-plane data is communicated at a lower rate using the at least one OFDM sub-carrier which is adjacent in frequency to the OFDM sub-carrier on which a reference signal is transmitted.

10. The method of claim 8, wherein no user-plane data is communicated using the at least one OFDM sub-carrier which is adjacent in frequency to the OFDM sub-carrier on which a reference signal is transmitted.

11. The method of claim 1, further comprising transmitting reference signals from the first base station using only the first group of the OFDM sub-carriers at times when control-plane data is not communicated by the first base station.

12. The method of claim 1, wherein user-plane data is not communicated between the second base station and the second terminal device at times when control-plane data is communicated between the first base station and the first terminal device.

13. The method of claim 1, further comprising communicating user-plane data between a further base station and a further terminal device using the second group of the OFDM sub-carriers.

14. The method of claim 13, wherein the second base station and the further base station are both relay base stations for the first base station, and the method further comprises communicating relay data between the first base station and the second base station and between the first base station and the further base station using the first group of the OFDM sub-carriers.

15. The method of claim 1, wherein a geographic extent of a communication cell associated with the second base station is smaller than and within a geographic extent of a communication cell associated with the first base station.

16. The method of claim 1, wherein the first and second base stations are located at different sites.

17. A wireless telecommunications system for communicating data between a plurality of base stations and a plurality of terminal devices using a plurality of Orthogonal Frequency Division Multiplex, OFDM, sub-carriers spanning a first frequency bandwidth, the system comprising:
a first base station configured to communicate user-plane data with a first terminal device using a first group of the OFDM sub-carriers distributed across the first frequency bandwidth; and
a second base station configured to communicate user-plane data with a second terminal device using a second group of the OFDM sub-carriers distributed across a second frequency bandwidth, wherein the second frequency bandwidth is smaller than and within the first frequency bandwidth, and wherein the first base station is configured to communicate control-plane data with the first terminal device using a combination of the first and second groups of the OFDM sub-carriers.

18. The wireless telecommunications system of claim 17, wherein the second base station is a relay base station for the first base station, and the first base station is configured to communicate relay data with the second base station using the first group of the OFDM sub-carriers.

19. The wireless telecommunications system of claim 18, wherein the first and second base stations are configured such that a lower amount of user-plane data is communicated using OFDM sub-carriers arranged in frequency at a boundary between OFDM sub-carriers in the first group and OFDM sub-carriers in the second group as compared to the amount of user-plane data communicated using OFDM sub-carriers away from the boundary.

20. The wireless telecommunications system of claim 19, wherein the first and second base stations are configured such that user-plane data is communicated at a reduced rate using OFDM sub-carriers at the boundary.

21. The wireless telecommunications system of claim 19, wherein the first and second base stations are configured such that no user-plane data is communicated using OFDM sub-carriers at the boundary.

22. The wireless telecommunications system of claim 17, wherein the first base station is configured to transmit reference signals using both the first and second groups of the OFDM sub-carriers.

23. The wireless telecommunications system of claim 22, wherein the first base station is configured such that the transmitted density of reference signals in time and/or frequency on the first group of the OFDM sub-carriers is greater than on the second group of the OFDM sub-carriers.

24. The wireless telecommunications system of claim 22, wherein the second base station is configured such that a lower amount of user-plane data is communicated using at least one OFDM sub-carrier which is adjacent in frequency to an OFDM sub-carrier on which a reference signal is transmitted in the second group of the OFDM sub-carriers as compared to the amount of user-plane data communicated using an OFDM sub-carrier that is not adjacent in frequency to the reference signal.

25. The wireless telecommunications system of claim 24, wherein the second base station is configured such that user-plane data is communicated at a reduced rate using the at least one OFDM sub-carrier which is adjacent in frequency to the OFDM sub-carrier on which the reference signal is transmitted.

26. The wireless telecommunications system of claim 24, wherein the second base station is configured such that no user-plane data is communicated using the at least one OFDM sub-carrier which is adjacent in frequency to the OFDM sub-carrier on which the reference signal is transmitted.

27. The wireless telecommunications system of claim 17, wherein the first base station is configured to transmit reference signals using only the first group of the OFDM sub-carriers at times when control-plane data is not being communicated by the first base station.

28. The wireless telecommunications system of claim 17, wherein the second base station is configured such that user-plane data is not communicated between the second base station and the second terminal device at times when control-plane data is communicated between the first base station and the first terminal device.

29. The wireless telecommunications system of claim 17, further comprising at least one further base station configured to communicate user-plane data with at least one further terminal device using the second group of the OFDM sub-carriers.

30. The wireless telecommunications system of claim 29, wherein the second base station and the further base station are both relay base stations for the first base station, and the first base station is configured to communicate relay data with the second base station and the further base station using the first group of the OFDM sub-carriers.

31. The wireless telecommunications system of claim 17, wherein a geographic extent of a communication cell associated with the second base station is smaller than and within a geographic extent of a communication cell associated with the first base station.

32. The wireless telecommunications system of claim 17, wherein the first and second base stations are located at different sites.

33. A method of operating a base station for communicating data between the base station and a plurality of terminal devices in a wireless telecommunications system using a plurality of Orthogonal Frequency Division Multiplex, OFDM, sub-carriers spanning a first frequency bandwidth, the method comprising:
communicating user-plane data with the plurality of terminal devices using a group of the OFDM sub-carriers distributed across a second frequency bandwidth which is smaller than and within the first frequency bandwidth; and
communicating no user-plane data with the plurality of terminal devices using OFDM sub-carriers outside the group of the OFDM sub-carriers distributed across the second frequency bandwidth.

34. A base station for communicating data with a plurality of terminal devices in a wireless telecommunications system using a plurality of Orthogonal Frequency Division Multiplex, OFDM, sub-carriers spanning a first frequency bandwidth, wherein the base station is configured to:
communicate user-plane data with the plurality of terminal devices using a group of the OFDM sub-carriers distributed across a second frequency bandwidth, wherein the second frequency bandwidth is smaller than and within the first frequency bandwidth; and
communicate no user-plane data with the plurality of terminal devices using OFDM sub-carriers outside the group of the OFDM sub-carriers distributed across the second frequency bandwidth.

35. A method of operating a terminal device for communicating data in a wireless telecommunications system comprising a first base station and a second base station, wherein the first base station supports communications using a plurality of Orthogonal Frequency Division Multiplex, OFDM, sub-carriers spanning a first frequency bandwidth, the method comprising:
communicating user-plane data between the second base station and the terminal device using a group of the OFDM sub-carriers distributed across a second frequency bandwidth, wherein the second frequency bandwidth is smaller than and within the first frequency bandwidth; and
communicating no user-plane data between the terminal device and the second base station using OFDM sub-carriers outside the group of the OFDM sub-carriers distributed across the second frequency bandwidth.

36. A terminal device for communicating data in a wireless telecommunications system comprising a first base station and a second base station, wherein the first base station supports communications using a plurality of Orthogonal Frequency Division Multiplex, OFDM, sub-carriers spanning a first frequency bandwidth, wherein the terminal device is configured to:
communicate user-plane data between the second base station and the terminal device using a group of the OFDM sub-carriers distributed across a second frequency bandwidth, wherein the second frequency bandwidth is smaller than and within the first frequency bandwidth; and
communicate no user-plane data between the terminal device and the second base station using OFDM sub-carriers outside the group of the OFDM sub-carriers distributed across the second frequency bandwidth.

* * * * *